United States Patent
Zhou et al.

(10) Patent No.: US 10,587,494 B2
(45) Date of Patent: Mar. 10, 2020

(54) NETWORK CONTROL METHOD AND APPARATUS

(71) Applicant: Huawei Technologies Co., Ltd., Shenzhen (CN)

(72) Inventors: Wei Zhou, Shanghai (CN); Pengcheng Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 15/364,523

(22) Filed: Nov. 30, 2016

(65) Prior Publication Data

US 2017/0085462 A1 Mar. 23, 2017

Related U.S. Application Data

(63) Continuation of application No. PCT/CN2014/078975, filed on May 30, 2014.

(51) Int. Cl.
*H04L 12/751* (2013.01)
*H04L 12/24* (2006.01)
(Continued)

(52) U.S. Cl.
CPC ............ *H04L 45/02* (2013.01); *H04L 41/044* (2013.01); *H04L 41/12* (2013.01); *H04L 45/22* (2013.01);
(Continued)

(58) Field of Classification Search
CPC ......... H04L 45/38; H04L 41/12; H04L 45/02; H04L 45/745; H04L 67/10; H04L 41/08; H04L 45/586
See application file for complete search history.

(56) References Cited

U.S. PATENT DOCUMENTS 5,185,860 A * 2/1993 Wu ..................... H04L 41/0213
709/224
2011/0317701 A1 12/2011 Yamato et al.
(Continued)

FOREIGN PATENT DOCUMENTS

CN 101212718 A 7/2008
CN 102833791 A 12/2012
(Continued)

OTHER PUBLICATIONS

J. Moy, OSPF Version 2, Apr. 1998, pp. 1-237 (Year: 1998).*
(Continued)

*Primary Examiner* — Christopher M Crutchfield
(74) *Attorney, Agent, or Firm* — Slater Matsil, LLP

(57) ABSTRACT

Embodiments of the present invention provide a network control method and apparatus. The network control method includes: receiving, by a first network controller, a request message of a forwarding plane device, where the request message includes information that is used to indicate a network event and information that is used to instruct to request a processing policy of the network event, and the first network controller is a primary network controller of the forwarding plane device; and if the first network controller determines, according to the request message, that the first network controller cannot provide the processing policy, sending, by the first network controller, the request message to a second network controller, receiving the processing policy sent by the second network controller, and sending the received processing policy to the forwarding plane device.

9 Claims, 8 Drawing Sheets

(51) Int. Cl.
*H04L 12/58* (2006.01)
*H04L 12/707* (2013.01)
*H04L 12/715* (2013.01)
*H04L 12/721* (2013.01)

(52) U.S. Cl.
CPC .............. *H04L 45/38* (2013.01); *H04L 51/00* (2013.01); *H04L 45/64* (2013.01)

(56) References Cited

U.S. PATENT DOCUMENTS

| | | | |
|---|---|---|---|
| 2012/0011264 A1 | 1/2012 | Izawa | |
| 2012/0134299 A1 | 5/2012 | Boutboul et al. | |
| 2013/0329601 A1 | 12/2013 | Yin et al. | |
| 2014/0294011 A1* | 10/2014 | Roessler | H04L 45/04 370/392 |
| 2014/0348172 A1 | 11/2014 | Akiyoshi | |
| 2015/0163151 A1* | 6/2015 | Li | H04L 47/2441 370/236 |

FOREIGN PATENT DOCUMENTS

| | | |
|---|---|---|
| CN | 102959908 A | 3/2013 |
| CN | 103475947 A | 12/2013 |
| EP | 1810447 A1 | 7/2007 |
| EP | 2487837 A1 | 8/2012 |
| JP | 2013522934 A | 6/2013 |
| WO | 2010116606 A1 | 10/2010 |
| WO | 2012070173 A1 | 5/2012 |
| WO | 2013075874 A1 | 5/2013 |
| WO | 2013107847 A2 | 7/2013 |

OTHER PUBLICATIONS

W. Braun, M. Menth, Software-Defined Networking Using OpenFlow: Protocols, Applications and Architectural Design Choices, Future Internet, 2014, pp. 302-336 (Year: 2014).*

D. King, A. Farrel, The Application of the Path Computation Element Architecture to the Determination of a Sequence of Domains in MPLS and GMPLS, IETF Draft, pp. 1-27, Apr. 2011 (Year: 2011).*

Wetherall, Service Introduction in Active Network, Feb. 1999, pp. 1-157 (Year: 1999).*

D. Decasper, B. Plattner, DAN: Distributed Code Caching for Active Network, Proceedings of IEEE INFOCOM 1998, 1998, pp. 609-616 (Year: 1998).*

* cited by examiner

NETWORK CONTROL METHOD AND APPARATUS

CROSS-REFERENCE TO RELATED APPLICATIONS

This application is a continuation of International Application No. PCT/CN2014/078975, filed on May 30, 2014, the disclosure of which is hereby incorporated by reference in its entirety.

TECHNICAL FIELD

Embodiments of the present invention relate to communications technologies, and in particular, to a network control method and apparatus.

BACKGROUND

A software-defined networking (SDN for short) network decouples control and data forwarding of a network device, network functions of a switch or a router are centralized in a controller, and a forwarding plane device performs only a data forwarding action.

During deployment of the SDN network in a large-scale distributed network, the network is usually divided into different segments. Each segment is referred to as an SDN domain, and multiple SDN domains are interconnected to form an entire SDN network. An SDN domain includes an SDN domain controller, a network controller, and a forwarding plane device. The SDN domain controller is a type of network controller. The forwarding plane device is mainly configured to perform data forwarding. The network controller performs configuration and management on the forwarding plane device by using a control channel. The SDN domain controller is configured to manage the network controller and the forwarding plane device in this domain. An application program in the network controller is used to modify a network behavior to adapt to different scenario requirements, for example, to provide a virtual network service, so that different logical functions can be implemented and mutually isolated in a same physical network.

In an SDN domain, by installing application programs on a network controller in a centralized manner, a network device in the SDN domain can implement complex network functions, such as routing control, tunnel encapsulation, firewall, secure access, and quality of service control. However, this manner brings extremely high running overheads to an SDN domain controller and the network controller, and causes a bottleneck in a control plane.

SUMMARY

Embodiments of the present invention provide a network control method and apparatus, so as to resolve a problem in the prior art that excessive application programs that can implement network functions are installed on a network controller in a centralized deployment manner, and consequently bring extremely high running overheads to the network controller and easily cause a bottleneck in a control plane.

According to a first aspect, an embodiment of the present invention provides a network control method. The method includes receiving, by a first network controller, a request message of a forwarding plane device, where the request message includes information that is used to indicate a network event and information that is used to instruct to request a processing policy of the network event, and the first network controller is a primary network controller of the forwarding plane device. The method also includes, if the first network controller determines, according to the request message, that the first network controller cannot provide the processing policy, sending, by the first network controller, the request message to a second network controller, so as to request the second network controller to provide the processing policy to the first network controller. The method also includes receiving, by the first network controller, the processing policy sent by the second network controller, and sending the received processing policy to the forwarding plane device.

In a first possible implementation manner of the first aspect, the sending, by the first network controller, the request message to a second network controller includes: sending, by the first network controller, the request message to a primary network controller of the first network controller; and if the primary network controller of the first network controller determines, according to the request message, that the primary network controller of the first network controller cannot provide the processing policy, sending the request message to the second network controller by using the primary network controller of the first network controller, where the second network controller is an upper-level network controller of the primary network controller of the first network controller or a sub network controller of the primary network controller of the first network controller.

According to the first aspect, in a second possible implementation manner, before the sending, by the first network controller, the request message to a second network controller, the method further includes: sending, by the first network controller, the request message to a primary network controller of the first network controller; and if the primary network controller of the first network controller determines, according to the request message, that the primary network controller of the first network controller cannot provide the processing policy, receiving, by the first network controller, a reject message sent by the primary network controller of the first network controller to reject sending the processing policy to the first network controller. The sending, by the first network controller, the request message to a second network controller includes: sending, by the first network controller, the request message to the second network controller according to the received reject message, where the second network controller is a secondary network controller of the first network controller, and the secondary network controller of the first network controller is at a same level with the primary network controller of the first network controller.

According to the first aspect, in a third possible implementation manner, the receiving, by the first network controller, the processing policy sent by the second network controller includes: if the second network controller determines, according to the request message, that the second network controller can provide the processing policy, receiving, by the first network controller, the processing policy sent by the second network controller according to the received request message, where the second network controller is a primary network controller of the first network controller.

According to the first aspect or the third possible implementation manner of the first aspect, in a fourth possible implementation manner, before the receiving, by a first network controller, a request message of a forwarding plane device, the method further includes: establishing, by the first network controller, a communication connection with the forwarding plane device; and obtaining, by the first network controller, first attribute information of the forwarding plane device, and sending the first attribute information of the forwarding plane device to the second network controller, so that according to the first attribute information of the forwarding plane device, the second network controller constructs a forwarding plane device topology and stores the forwarding plane device topology.

According to the fourth possible implementation manner of the first aspect, in a fifth possible implementation manner, the first attribute information of the forwarding plane device includes at least one of an identifier, a port number, a port Media Access Control MAC address, a port Internet Protocol IP address, a virtual local area network VLAN, bandwidth, a computing capability, or a link feature of the forwarding plane device; and the link feature includes at least one of a device identification number, a port number, a MAC address, or an IP address of a peer device connected to the forwarding plane device.

According to any one of the first aspect, or the third to the fifth possible implementation manners of the first aspect, in a sixth possible implementation manner, the method further includes: sending, by the first network controller, information used to identify a network function supported by the first network controller to the second network controller, so that the second network controller stores the information used to identify the network function supported by the first network controller.

According to any one of the fourth to the sixth possible implementation manners of the first aspect, in a seventh possible implementation manner, the method further includes: sending, by the first network controller, second attribute information of the forwarding plane device to the second network controller, so that the second network controller stores the second attribute information of the forwarding plane device, where the second attribute information includes at least one of flow table information of the forwarding plane device, status information of a link between the forwarding plane devices, or data caching information of the forwarding plane device.

According to any of the first aspect, or the first to the seventh possible implementation manners of the first aspect, in an eighth possible implementation manner, before the sending, by the first network controller, the request message to a second network controller, the method further includes: establishing, by the first network controller, a communication connection with the second network controller; and sending, by the first network controller, attribute information obtained by the first network controller to the second network controller, so that according to the attribute information obtained by the first network controller, the second network controller constructs a network controller topology and stores the network controller topology. The attribute information obtained by the first network controller includes: attribute information of the first network controller, or attribute information of the first network controller and attribute information of a network controller communicatively connected to the first network controller.

According to the eighth possible implementation manner of the first aspect, in a ninth possible implementation manner, the attribute information of the first network controller includes at least one of an identifier of the first network controller, information used to identify a role of the first network controller, or information used to identify a feature of the first network controller; and the attribute information of the network controller communicatively connected to the first network controller includes at least one of an identifier of a network controller at a same level with the first network controller and communicatively connected to the first network controller, information used to identify a role of the network controller at the same level with the first network controller and communicatively connected to the first network controller, or information used to identify a feature of the network controller communicatively connected to the first network controller.

According to a second aspect, an embodiment of the present invention provides a network control method. The method includes receiving, by a second network controller, a request message sent by a first network controller, where the request message includes a network event, and is used to request a processing policy of the network event, and the request message is sent to the second network controller by the first network controller after the first network controller receives the request message sent by a forwarding plane device or a lower-level network controller of the first network controller and determines, according to the request message, that the first network controller cannot provide the processing policy; and sending, by the second network controller, the processing policy to the first network controller, so that the first network controller sends the processing policy to the forwarding plane device or the lower-level network controller of the first network controller.

In a first possible implementation manner of the second aspect, that the request message is sent to the second network controller by the first network controller after the first network controller receives the request message sent by a forwarding plane device or a lower-level network controller of the first network controller and determines, according to the request message, that the first network controller cannot provide the processing policy includes: the request message is sent to a primary network controller of the first network controller by the first network controller after the first network controller receives the request message sent by the forwarding plane device or the lower-level network controller of the first network controller and determines, according to the request message, that the first network controller cannot provide the processing policy, and is sent to the second network controller by the first network controller by using the primary network controller of the first network controller if the primary network controller of the first network controller determines, according to the request message, that the primary network controller of the first network controller cannot provide the processing policy. The receiving, by a second network controller, a request message sent by a first network controller includes: receiving, by the second network controller, the request message sent by the first network controller by using the primary network controller of the first network controller, where the second network controller is an upper-level network controller of the primary network controller of the first network controller or a sub network controller of the primary network controller of the first network controller.

According to the second aspect, in a second possible implementation manner, that the request message is sent to the second network controller by the first network controller after the first network controller receives the request message sent by a forwarding plane device or a lower-level network controller of the first network controller and determines, according to the request message, that the first network controller cannot provide the processing policy includes: the request message is sent to a primary network controller of the first network controller by the first network controller after the first network controller receives the request message sent by the forwarding plane device or the lower-level network controller of the first network controller, and is sent to the second network controller by the first network controller after the primary network controller of the first network controller determines, according to the request message, that the primary network controller of the first network controller cannot provide the processing policy, and sends a reject message to the first network controller, where the second network controller is a secondary network controller of the first network controller, and the secondary network controller of the first network controller is at a same level with the primary network controller of the first network controller.

According to any of the second aspect, or the first and the second possible implementation manners of the second aspect, in a third possible implementation manner, before the sending, by the second network controller, the processing policy to the first network controller, the method further includes: determining, by the second network controller according to the request message, that the second network controller can provide the processing policy, where the second network controller is the primary network controller of the first network controller.

According to the second aspect or the third possible implementation manner of the second aspect, in a fourth possible implementation manner, before the receiving, by a second network controller, a request message sent by a first network controller, the method further includes: establishing, by the second network controller, a communication connection with the first network controller; receiving, by the second network controller, attribute information obtained and sent by the first network controller; and constructing, by the second network controller according to the received attribute information obtained by the first network controller, a network controller topology and storing the network controller topology. The attribute information obtained by the first network controller includes: attribute information of the first network controller, or attribute information of the first network controller and attribute information of a network controller communicatively connected to the first network controller.

According to the fourth possible implementation manner of the second aspect, in a fifth possible implementation manner, the attribute information of the first network controller includes at least one of an identifier of the first network controller, information used to identify a role of the first network controller, or information used to identify a feature of the first network controller; and the attribute information of the network controller communicatively connected to the first network controller includes at least one of an identifier of a network controller at a same level with the first network controller and communicatively connected to the first network controller, information used to identify a role of the network controller at the same level with the first network controller and communicatively connected to the first network controller, or information used to identify a feature of the network controller communicatively connected to the first network controller.

According to the fifth possible implementation manner of the second aspect, in a sixth possible implementation manner, after the constructing, by the second network controller according to the received attribute information of the first network controller, a first topology and storing the first topology, the method further includes: receiving, by the second network controller, first attribute information of the forwarding plane device sent by the first network controller; and storing, by the second network controller, the first attribute information of the forwarding plane device.

According to the fifth or the sixth possible implementation manner of the second aspect, in a seventh possible implementation manner, the first attribute information of the forwarding plane device includes at least one of an identifier, a port number, a port Media Access Control MAC address, a port Internet Protocol IP address, a virtual local area network VLAN, bandwidth, a computing capability, or a link feature of the forwarding plane device; and the link feature includes at least one of a device identification number, a port number, a MAC address, or an IP address of a peer device connected to the forwarding plane device.

According to any one of the second aspect, or the third possible implementation manner of the second aspect, or the sixth possible implementation manner of the second aspect, or the seventh possible implementation manner of the second aspect, in an eighth possible implementation manner, the method further includes: receiving, by the second network controller, information that is sent by the first network controller and that is used to identify a network function supported by the first network controller; and storing, by the second network controller, the information used to identify the network function supported by the first network controller.

According to any one of the fourth to the eighth possible implementation manners of the second aspect, in a ninth possible implementation manner, the method further includes: receiving, by the second network controller, second attribute information of the forwarding plane device sent by the first network controller; and storing, by the second network controller, the second attribute information of the forwarding plane device.

According to the ninth possible implementation manner of the second aspect, in a tenth possible implementation manner, the second attribute information of the forwarding plane device includes at least one of flow table information of the forwarding plane device, status information of a link between the forwarding plane devices, or data caching information of the forwarding plane device.

According to the ninth possible implementation manner of the second aspect, in a tenth possible implementation manner, the second attribute information of the forwarding plane device includes at least one of flow table information of the forwarding plane device, status information of a link between the forwarding plane devices, or data caching information of the forwarding plane device.

According to a third aspect, an embodiment of the present invention provides a network control apparatus. The apparatus includes a receiving module, configured to receive a request message of a forwarding plane device, where the request message includes information that is used to indicate a network event and information that is used to instruct to request a processing policy of the network event. The apparatus also includes a sending module, configured to: if a first network controller determines, according to the request message, that the first network controller cannot provide the processing policy, send the request message to a second network controller, so as to request the second network controller to provide the processing policy to the first network controller; where the first network controller is a primary network controller of the forwarding plane device. The receiving module is further configured to receive the processing policy sent by the second network controller. The sending module is further configured to send the received processing policy to the forwarding plane device.

In a first possible implementation manner of the third aspect, the sending module is specifically configured to: send the request message to a primary network controller of the first network controller; and if the primary network controller of the first network controller determines, according to the request message, that the primary network controller of the first network controller cannot provide the processing policy, send the request message to the second network controller by using the primary network controller of the first network controller, where the second network controller is an upper-level network controller of the primary network controller of the first network controller or a sub network controller of the primary network controller of the first network controller.

According to the third aspect, in a second possible implementation manner, the second sending module is further configured to: send the request message to a primary network controller of the first network controller before sending the request message to the second network controller; and if the primary network controller of the first network controller determines, according to the request message, that the primary network controller of the first network controller cannot provide the processing policy, receive a reject message sent by the primary network controller of the first network controller to reject sending the processing policy to the first network controller. The sending module is specifically configured to send the request message to the second network controller according to the received reject message, where the second network controller is a secondary network controller of the first network controller, and the secondary network controller of the first network controller is at a same level with the primary network controller of the first network controller.

According to the third aspect, in a third possible implementation manner, the receiving module is specifically configured to: if the second network controller determines, according to the request message, that the second network controller can provide the processing policy, receive the processing policy sent by the second network controller according to the received request message, where the second network controller is a primary network controller of the first network controller.

According to the third aspect or the third possible implementation manner of the third aspect, in a fourth possible implementation manner, the apparatus further includes: a processing module, configured to: before the first network controller receives the request message of the forwarding plane device, establish a communication connection with the forwarding plane device; and obtain first attribute information of the forwarding plane device. The sending module is further configured to send the first attribute information of the forwarding plane device to the second network controller, so that according to the first attribute information of the forwarding plane device, the second network controller constructs a forwarding plane device topology and stores the forwarding plane device topology.

According to the fourth possible implementation manner of the third aspect, in a fifth possible implementation manner, the first attribute information of the forwarding plane device includes at least one of an identifier, a port number, a port Media Access Control MAC address, a port Internet Protocol IP address, a virtual local area network VLAN, bandwidth, a computing capability, or a link feature of the forwarding plane device; and the link feature includes at least one of a device identification number, a port number, a MAC address, or an IP address of a peer device connected to the forwarding plane device.

According to any one of the third aspect, or the third to the fifth possible implementation manners of the third aspect, in a sixth possible implementation manner, the sending module is further configured to send information used to identify a network function supported by the first network controller to the second network controller, so that the second network controller stores the information used to identify the network function supported by the first network controller.

According to any one of the fourth to the sixth possible implementation manners of the third aspect, in a seventh possible implementation manner, the sending module is further configured to send second attribute information of the forwarding plane device to the second network controller, so that the second network controller stores the second attribute information of the forwarding plane device, where the second attribute information includes at least one of flow table information of the forwarding plane device, status information of a link between the forwarding plane devices, or data caching information of the forwarding plane device.

According to any of the third aspect, or the first to the seventh possible implementation manners of the third aspect, in an eighth possible implementation manner, the processing module is further configured to: before the first network controller sends the request message to the second network controller, establish a communication connection with the second network controller. The sending module is configured to send attribute information obtained by the first network controller to the second network controller, so that according to the attribute information obtained by the first network controller, the second network controller constructs a network controller topology and stores the network controller topology. The attribute information obtained by the first network controller includes: attribute information of the first network controller, or attribute information of the first network controller and attribute information of a network controller communicatively connected to the first network controller.

According to the eighth possible implementation manner of the third aspect, in a ninth possible implementation manner, the attribute information of the first network controller includes at least one of an identifier of the first network controller, information used to identify a role of the first network controller, or information used to identify a feature of the first network controller. The attribute information of the network controller communicatively connected to the first network controller includes at least one of an identifier of a network controller at a same level with the first network controller and communicatively connected to the first network controller, information used to identify a role of the network controller at the same level with the first network controller and communicatively connected to the first network controller, or information used to identify a feature of the network controller communicatively connected to the first network controller.

According to a fourth aspect, an embodiment of the present invention provides a network control apparatus. The apparatus includes a receiving module, configured to receive a request message sent by a first network controller, where the request message includes a network event, and is used to request a processing policy of the network event, and the request message is sent to a second network controller by the first network controller after the first network controller receives the request message sent by a forwarding plane device or a lower-level network controller of the first network controller and determines, according to the request message, that the first network controller cannot provide the processing policy. The apparatus also includes a sending module, configured to send the processing policy to the first network controller, so that the first network controller sends the processing policy to the forwarding plane device or the lower-level network controller of the first network controller.

In a first possible implementation manner of the fourth aspect, that the request message is sent to a second network controller by the first network controller after the first network controller receives the request message sent by a forwarding plane device or a lower-level network controller of the first network controller and determines, according to the request message, that the first network controller cannot provide the processing policy includes: the request message is sent to a primary network controller of the first network controller by the first network controller after the first network controller receives the request message sent by the forwarding plane device or the lower-level network controller of the first network controller and determines, according to the request message, that the first network controller cannot provide the processing policy, and is sent to the second network controller by the first network controller by using the primary network controller of the first network controller if the primary network controller of the first network controller determines, according to the request message, that the primary network controller of the first network controller cannot provide the processing policy; where the second network controller is an upper-level network controller of the primary network controller of the first network controller or a sub network controller of the primary network controller of the first network controller. The receiving module is specifically configured to receive the request message sent by the first network controller by using the primary network controller of the first network controller.

According to the fourth aspect, in a second possible implementation manner, that the request message is sent to a second network controller by the first network controller after the first network controller receives the request message sent by a forwarding plane device or a lower-level network controller of the first network controller and determines, according to the request message, that the first network controller cannot provide the processing policy includes: the request message is sent to a primary network controller of the first network controller by the first network controller after the first network controller receives the request message sent by the forwarding plane device or the lower-level network controller of the first network controller, and is sent to the second network controller by the first network controller after the primary network controller of the first network controller determines, according to the request message, that the primary network controller of the first network controller cannot provide the processing policy, and sends a reject message to the first network controller, where the second network controller is a secondary network controller of the first network controller, and the secondary network controller of the first network controller is at a same level with the primary network controller of the first network controller.

According to any one of the fourth aspect, or the first and the second possible implementation manners of the fourth aspect, in a third possible implementation manner, the apparatus further includes: a processing module, configured to: before the second network controller sends the processing policy to the first network controller, determine, according to the request message, that the second network controller can provide the processing policy, where the second network controller is the primary network controller of the first network controller.

According to the fourth aspect or the third possible implementation manner of the fourth aspect, in a fourth possible implementation manner, the processing module is further configured to: before the request message sent by the first network controller is received, establish a communication connection with the first network controller; the receiving module is further configured to receive attribute information obtained and sent by the first network controller; and the processing module is further configured to: according to the received attribute information obtained by the first network controller, construct a network controller topology and store the network controller topology. The attribute information obtained by the first network controller includes: attribute information of the first network controller, or attribute information of the first network controller and attribute information of a network controller communicatively connected to the first network controller.

According to the fourth possible implementation manner of the fourth aspect, in a fifth possible implementation manner, the attribute information of the first network controller includes at least one of an identifier of the first network controller, information used to identify a role of the first network controller, or information used to identify a feature of the first network controller; and the attribute information of the network controller communicatively connected to the first network controller includes at least one of an identifier of a network controller at a same level with the first network controller and communicatively connected to the first network controller, information used to identify a role of the network controller at the same level with the first network controller and communicatively connected to the first network controller, or information used to identify a feature of the network controller communicatively connected to the first network controller.

According to the fifth possible implementation manner of the fourth aspect, in a sixth possible implementation manner, the receiving module is further configured to: after a first topology is constructed and the first topology is stored according to the received attribute information of the first network controller, receive first attribute information of the forwarding plane device sent by the first network controller; and store the first attribute information of the forwarding plane device.

According to the sixth possible implementation manner of the fourth aspect, in a seventh possible implementation manner, the first attribute information of the forwarding plane device includes at least one of an identifier, a port number, a port Media Access Control MAC address, a port Internet Protocol IP address, a virtual local area network VLAN, bandwidth, a computing capability, or a link feature of the forwarding plane device; and the link feature includes at least one of a device identification number, a port number, a MAC address, or an IP address of a peer device connected to the forwarding plane device.

According to any one of the fourth aspect, or the third possible implementation manner of the fourth aspect, or the sixth possible implementation manner of the fourth aspect, or the seventh possible implementation manner of the fourth aspect, in an eighth possible implementation manner, the receiving module is further configured to receive information that is sent by the first network controller and that is used to identify a network function supported by the first network controller; and store the information used to identify the network function supported by the first network controller.

According to one of the fourth to the eighth possible implementation manners of the fourth aspect, in a ninth possible implementation manner, the receiving module is further configured to receive second attribute information of the forwarding plane device sent by the first network controller; and store the second attribute information of the forwarding plane device.

According to the ninth possible implementation manner of the fourth aspect, in a tenth possible implementation manner, the second attribute information of the forwarding plane device includes at least one of flow table information of the forwarding plane device, status information of a link between the forwarding plane devices, or data caching information of the forwarding plane device.

According to the network control method and apparatus provided in the embodiments of the present invention, different network functions are deployed on different network controllers; and when a network controller cannot provide a processing policy, requested by a forwarding plane device, of a network event, the network controller may send a request message to another network controller that can provide the processing policy, to request to obtain the processing policy of the network event. Therefore, a problem in the prior art is resolved that excessive application programs that can implement network functions are installed on a network controller in a centralized deployment manner, and consequently bring extremely high running overheads to the network controller and easily cause a bottleneck in a control plane. In a network deployment manner, different network functions are separately undertaken by using different network controllers, and if a network controller itself cannot provide a processing policy of processing a network event, the network controller may request the processing policy from another network controller, which reduces computation processing overheads of each network controller, and improves network scalability.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
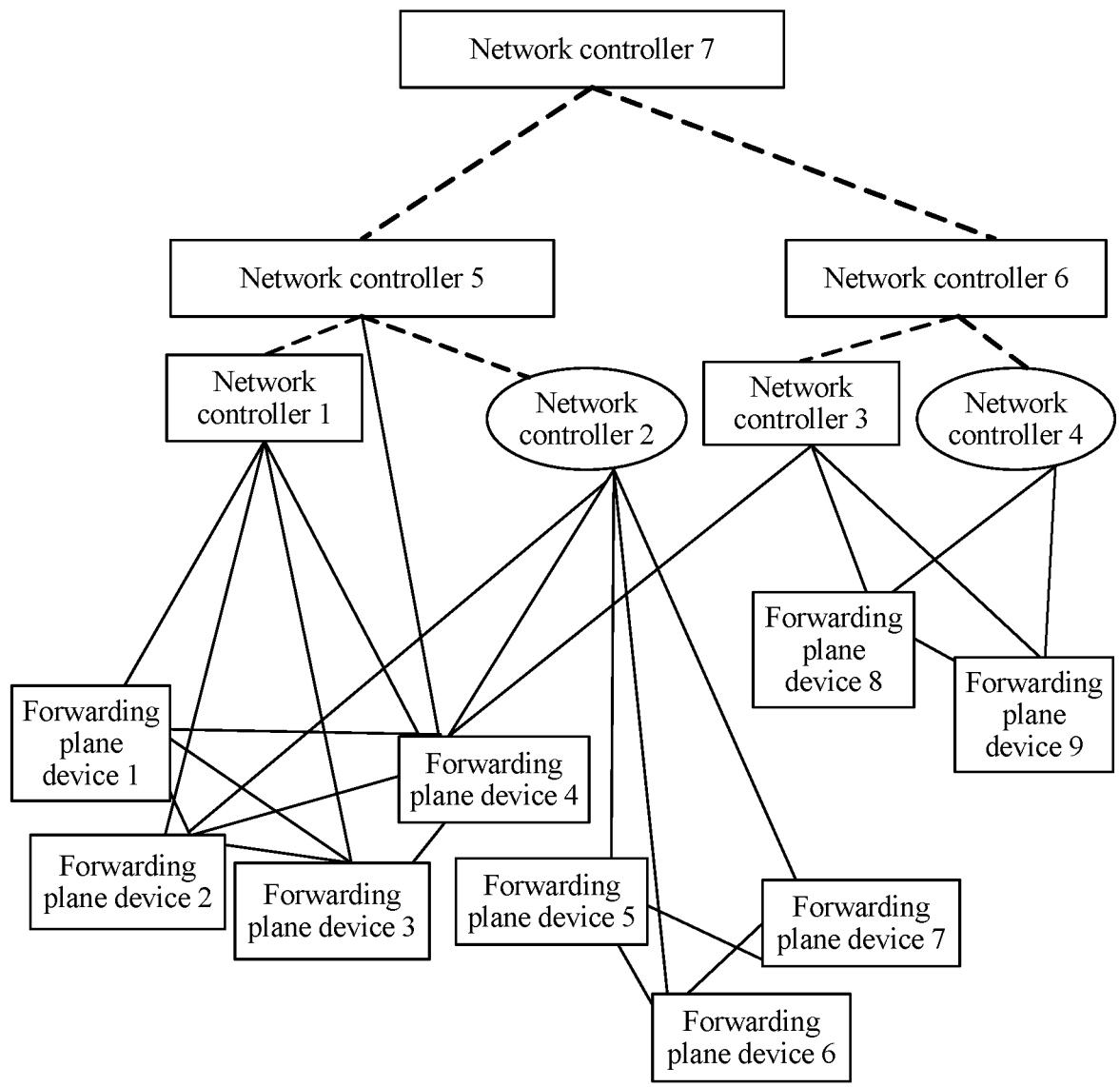
FIG. 1 shows a diagram of a network architecture on which an embodiment of the present invention is based.

FIG. 1 shows a diagram of a network architecture on which an embodiment of the present invention is based. However, the present invention may further be based on another network architecture, which is not limited in this embodiment of the present invention.

Network control networking shown in FIG. 1 may include a network controller 1, a network controller 2, a network controller 3, a network controller 4, a network controller 5, a network controller 6, a network controller 7, a forwarding plane device 1, a forwarding plane device 2, a forwarding plane device 3, a forwarding plane device 4, a forwarding plane device 5, a forwarding plane device 6, a forwarding plane device 7, a forwarding plane device 8, and a forwarding plane device 9. Different network functions are separately deployed for different network controllers. A forwarding plane device may be configured to perform data forwarding, for example, may be a switching device, a routing device, or a gateway, or may be a switch supporting a network switching model (OpenFlow) protocol. The network controller 1 and the network controller 2 are separately connected to the network controller 5 based on a "proprietary protocol" and are lower-level network controllers of the network controller 5, or the network controller 1 and the network controller 2 may be referred to as sub network controllers of the network controller 5. Correspondingly, the network controller 5 may be used as a primary network controller of the network controller 1 and the network controller 2. It should be noted that configuration may be performed on the network controller 1 to configure an IP address of the network controller 5 as the primary network controller of the network controller 1, and configuration may be performed on the network controller 2 to configure the IP address of the network controller 5 as the primary network controller of the network controller 2. Alternatively, configuration of a secondary network controller of the network controller 1 may be performed on the network controller 1. For example, if another network controller at a same level with the network controller 5 exists, the another network controller at the same level with the network controller 5 may be configured as the secondary network controller of the network controller 1. The network controller 3 and the network controller 4 are separately connected to the network controller 6 also based on the "proprietary protocol" and are lower-level network controllers of the network controller 6, or the network controller 3 and the network controller 4 may be referred to as sub network controllers of the network controller 6. Likewise, the network controller 6 may be used as a primary network controller of the network controller 3 and the network controller 4. The network controller 1, the network controller 2, the network controller 3, and the network controller 4 are at a same level. The network controller 5 and the network controller 6 are devices located at a same level in the networking, establish a connection based on a Self-Defending Network Initiative (SDNI for short) protocol, and are lower-level network controllers of the network controller 7. The network controller 5 and the network controller 6 are at the same level. As shown in FIG. 1, elliptical frames are used to indicate the network controller 2 and the network controller 4. The network controller 2 and the network controller 4 can be connected to only a forwarding plane device. Rectangular frames are used to indicate the network controller 1, the network controller 3, the network controller 5, the network controller 6, and the network controller 7. The network controller 1, the network controller 3, the network controller 5, the network controller 6, and the network controller 7 can be not only connected to the forwarding plane device, but also connected to another network controller. For example, the network controller 5 can be not only connected to the forwarding plane device 4, but also connected to the network controller 1 and the network controller 2. The network control networking shown in FIG. 1 has three levels in total. The network controller 1, the network controller 2, the network controller 3, and the network controller 4 are network controllers at a bottom level, and a quantity of levels of network control networking is configured on the network controller 1, the network controller 2, the network controller 3, and the network controller 4. There is a counter configured for each request message. The quantity of levels of network control networking is indicated by using the counter. The counter is reduced by 1 each time when a request message passes one level of network controller. If a value of the counter is exactly o when a level of network controller processes the request message, the network controller discards the request message and performs no further uploading even if the network controller cannot process the request message. For example, if the network controller 1 is configured as a primary network controller of the forwarding plane device 4, a network control networking level configured by the network controller 1 is 3, and the network controller 1 receives a request message sent by the forwarding plane device 4, a counter is configured for the request message and is 3. If determining that the network controller 1 cannot provide a processing policy, the network controller 1 reduces the counter by 1. Because the upper-level network controller 5 is configured for the network controller 1, the network controller 1 may forward the request information to the network controller 5, and the network controller 5 determines whether the network controller 5 can provide the processing policy. Similarly, if the network controller 5 cannot provide the processing policy, the network controller 5 reduces the counter by 1. Because the upper-level network controller 7 is configured for the network controller 5, and a request message report mechanism is configured for the network controller 5, the network controller 5 can report the request message to the network controller 7, and request the network controller 7 to provide the processing policy. If the network controller 7 cannot provide the processing policy, after the network controller 7 reduces the counter by 1, it is o and no further uploading is performed. It should be noted that whether a network controller can report a request message to an upper-level network controller of the network controller depends on whether a request message report mechanism is configured for the network controller and whether the network controller has the upper-level network controller. For a network controller having a primary network controller and a secondary network controller, after receiving a request message, the network controller first reports the request message to the primary network controller of the network controller. For example, because the network controller 5 is the primary network controller of the network controller 1, if the network controller 1 cannot provide the processing policy, the network controller 1 first forwards the request information to the network controller 5.

Based on the diagram of the network architecture of this embodiment of the present invention shown in FIG. 1, different network functions are deployed on different network controllers by using the network architecture formed by hierarchically deployed network controllers. When a network controller itself cannot provide a processing policy, the network controller may request the processing policy from an upper-level network controller of the network controller or from a sub network controller of the network controller, so that a problem in the prior art is avoided that excessive application programs are installed on the network controller and consequently bring extremely high running overheads to the network controller and easily cause a bottleneck in a control plane, computation processing overheads of each network controller are reduced, and network scalability is improved.

Figure 2:
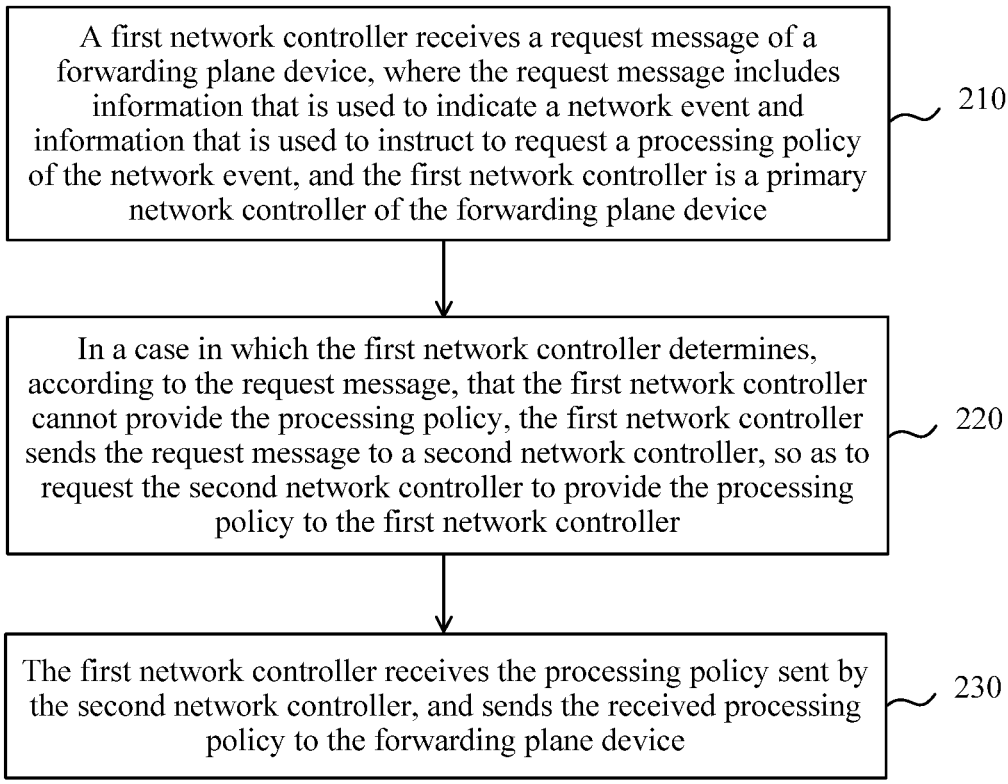
FIG. 2 is a flowchart of a network control method according to an embodiment of the present invention.

FIG. 2 is a flowchart of a network control method according to an embodiment of the present invention. The method in this embodiment is applicable to a case in which different network functions are deployed on different network controllers in a hierarchical network deployment manner, to prevent excessive application programs being installed on a network controller and bringing extremely high running overheads to the network controller in the prior art, simplify computation processing overheads of each network controller, and improve network control scalability. The method is executed by a network controller, and the apparatus is generally implemented in a hardware and/or software manner. The method in this embodiment includes the following steps.

210. A first network controller receives a request message of a forwarding plane device, where the request message includes information that is used to indicate a network event and information that is used to instruct to request a processing policy of the network event, and the first network controller is a primary network controller of the forwarding plane device.

The request message may be sent by the forwarding plane device directly connected to the first network controller, or may be sent by a sub network controller of the first network controller directly connected to the forwarding plane device that sends the request message. The network event may be a flow table request message, for example, may be an incoming packet "packet_in" packet, or may be a port status message or a link status message, or may be another message related to a function of the network controller and the forwarding plane device. The processing policy may be flow table modification, flow table addition, flow table deletion, service transmission path update, forwarding plane device cache update, and another policy related to the function of the network controller.

220. If the first network controller determines, according to the request message, that the first network controller cannot provide the processing policy, the first network controller sends the request message to a second network controller, so as to request the second network controller to provide the processing policy to the first network controller.

In the prior art, configuration and management functions of an SDN domain controller in each SDN domain only center on a network controller and a forwarding plane device within the SDN domain, and configuration and management functions of the network controller within the SDN domain only center on the forwarding plane device within the SDN domain. Therefore, if the forwarding plane device wants to implement complex network functions, such as routing control, tunnel encapsulation, firewall, secure access, and quality of service control, application programs to implement the foregoing complex network functions need to be installed on the network controller and the SDN domain controller, and consequently bring extremely high running overheads to the SDN domain controller and the network controller and easily cause a control bottleneck problem. In addition, when device expansion or function extension needs to be performed for a network, only a cumulative overlay manner can be used, and there may be increasingly superfluous programs on the SDN domain controller and the network controller, which may cause running stability and reliability problems, and if no application program to implement some network functions is installed on the SDN domain controller and the network controller, the received request message can only be discarded.

In a hierarchical deployment network control structure used in this embodiment, each layer is formed by multiple network controllers, each network controller may be a sub network controller of an upper-level network controller (a primary network controller or a secondary network controller) of the network controller, or may be an upper-level network controller (a primary network controller or a secondary network controller) of a lower-level network controller (a sub network controller) of the network controller, and a dedicated network control function may be deployed on each network controller. Therefore, if a network controller has an upper-level network controller and the network controller is a primary network controller, the network controller may allocate a request message that cannot be processed by the network controller to the upper-level network controller of the network controller for processing, or deliver the request message to a sub network controller of the network controller for processing, so as to request the upper-level network controller of the network controller or the sub network controller of the network controller to provide the processing policy to the network controller. In step 220, in the case in which the first network controller determines, according to the request message, that the first network controller cannot provide the processing policy, the first network controller may send the request message to the second network controller, so as to request the second network controller to provide the processing policy to the first network controller. Because the first network controller may request the processing policy from another network controller if the first network controller itself cannot provide the processing policy, a problem in the prior art is avoided that excessive application programs are installed on an SDN domain controller and a network controller and bring extremely high running overheads to the SDN domain controller and the network controller, computation processing overheads of each network controller are reduced, and network scalability is improved.

230. The first network controller receives the processing policy sent by the second network controller, and sends the received processing policy to the forwarding plane device.

Specifically, the first network controller receives the request message of the forwarding plane device; and in the case in which the first network controller determines, according to the request message, that the first network controller cannot provide the processing policy, the first network controller sends the request message to the second network controller, receives the processing policy sent by the second network controller, and sends the received processing policy to the forwarding plane device.

According to the network control method provided in this embodiment, a first network controller receives a request message of a forwarding plane device. If the first network controller determines, according to the request message, that the first network controller cannot provide the processing policy, the first network controller sends the request message to a second network controller, receives the processing policy sent by the second network controller, and sends the received processing policy to the forwarding plane device. Therefore, a problem in the prior art is resolved that excessive application programs that can implement network functions are installed on a network controller and an SDN domain controller in a centralized deployment manner, and consequently bring extremely high running overheads to the SDN domain controller and the network controller and easily cause a bottleneck in control. In a hierarchical network deployment manner, different network functions are separately undertaken by using different network controllers, and if a network controller itself cannot provide a processing policy of processing a network event, the network controller may request the processing policy from another network controller, which reduces computation processing overheads of each network controller, and improves network scalability.

Figure 3:
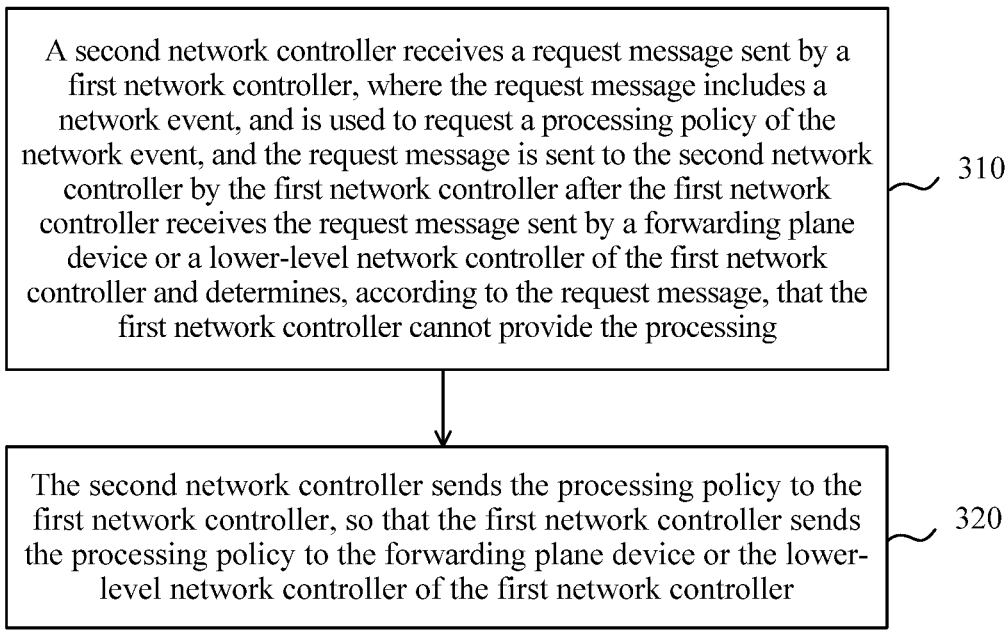
FIG. 3 is a flowchart of another network control method according to an embodiment of the present invention.

FIG. 3 is a flowchart of another network control method according to an embodiment of the present invention. Referring to FIG. 3, the method in this embodiment is applicable to a case in which a hierarchical network deployment manner is used to simplify computation processing overheads of each network controller and improve network control scalability. The method is executed by a network controller, and the apparatus is generally implemented in a hardware and/or software manner. The method provided in this embodiment of the present invention may be used along with the method provided in the embodiment of the present invention in FIG. 2. The method in this embodiment includes the following steps.

310. A second network controller receives a request message sent by a first network controller, where the request message includes a network event, and is used to request a processing policy of the network event, and the request message is sent to the second network controller by the first network controller after the first network controller receives the request message sent by a forwarding plane device or a lower-level network controller of the first network controller and determines, according to the request message, that the first network controller cannot provide the processing policy.

If the first network controller determines, according to the request message, that the first network controller cannot provide the processing policy, the first network controller sends the request message to the second network controller. The second network controller receives the request message sent by the first network controller, so that the second network controller can provide the processing policy to the first network controller according to the request message. Because different functions are deployed on different network controllers, if the first network controller itself cannot provide the processing policy, the first network controller may request the processing policy from another network controller, so that a problem in the prior art is avoided that excessive application programs are installed on an SDN domain controller and a network controller and bring extremely high running overheads to the SDN domain controller and the network controller, computation processing overheads of each network controller are reduced, and network scalability is improved.

320. The second network controller sends the processing policy to the first network controller, so that the first network controller sends the processing policy to the forwarding plane device or the lower-level network controller of the first network controller.

When the second network controller can provide the processing policy, the second network controller sends the processing policy to the first network controller, so that the first network controller can send the processing policy to the forwarding plane device or a sub network controller of the first network controller. The second network controller may be a primary network controller of the first network controller, or may be another sub network controller of the first network controller.

According to the network control method provided in this embodiment, different functions are deployed on different network controllers; and if a first network controller itself cannot provide a processing policy, the first network controller may request the processing policy from another network controller. Therefore, a problem in the prior art is resolved that excessive application programs that can implement network functions are installed on a network controller and an SDN domain controller in a centralized deployment manner, and consequently bring extremely high running overheads to the SDN domain controller and the network controller and easily cause a bottleneck in a control plane. In a network deployment manner, different network functions are separately undertaken by using different network controllers, and if a network controller itself cannot provide a processing policy of processing a network event, the network controller may request the processing policy from another network controller, which reduces computation processing overheads of each network controller, and improves network scalability.

Figure 4A:
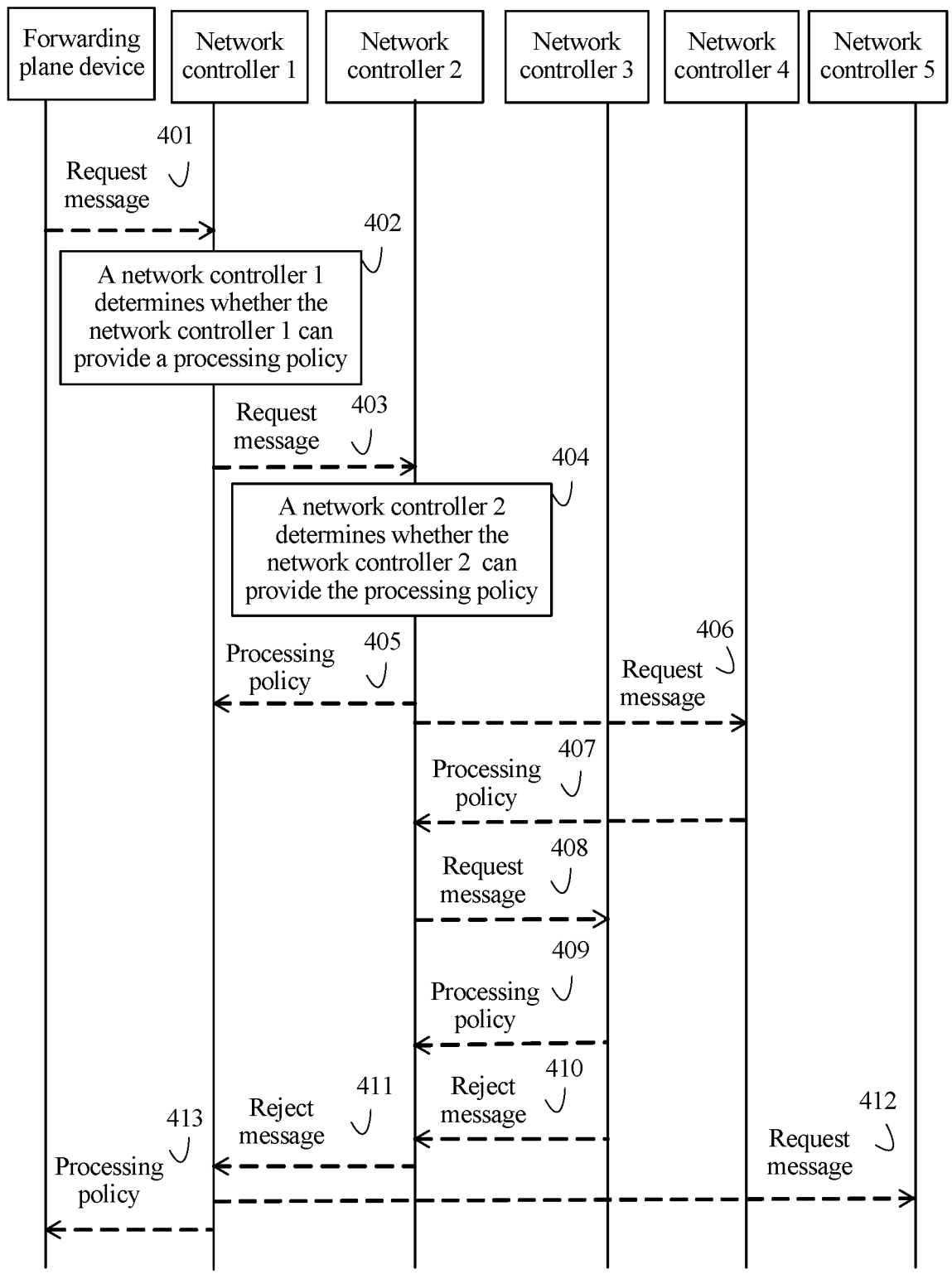
FIG. 4A is a signaling flowchart of a network control method according to an embodiment of the present invention.
Figure 4B:
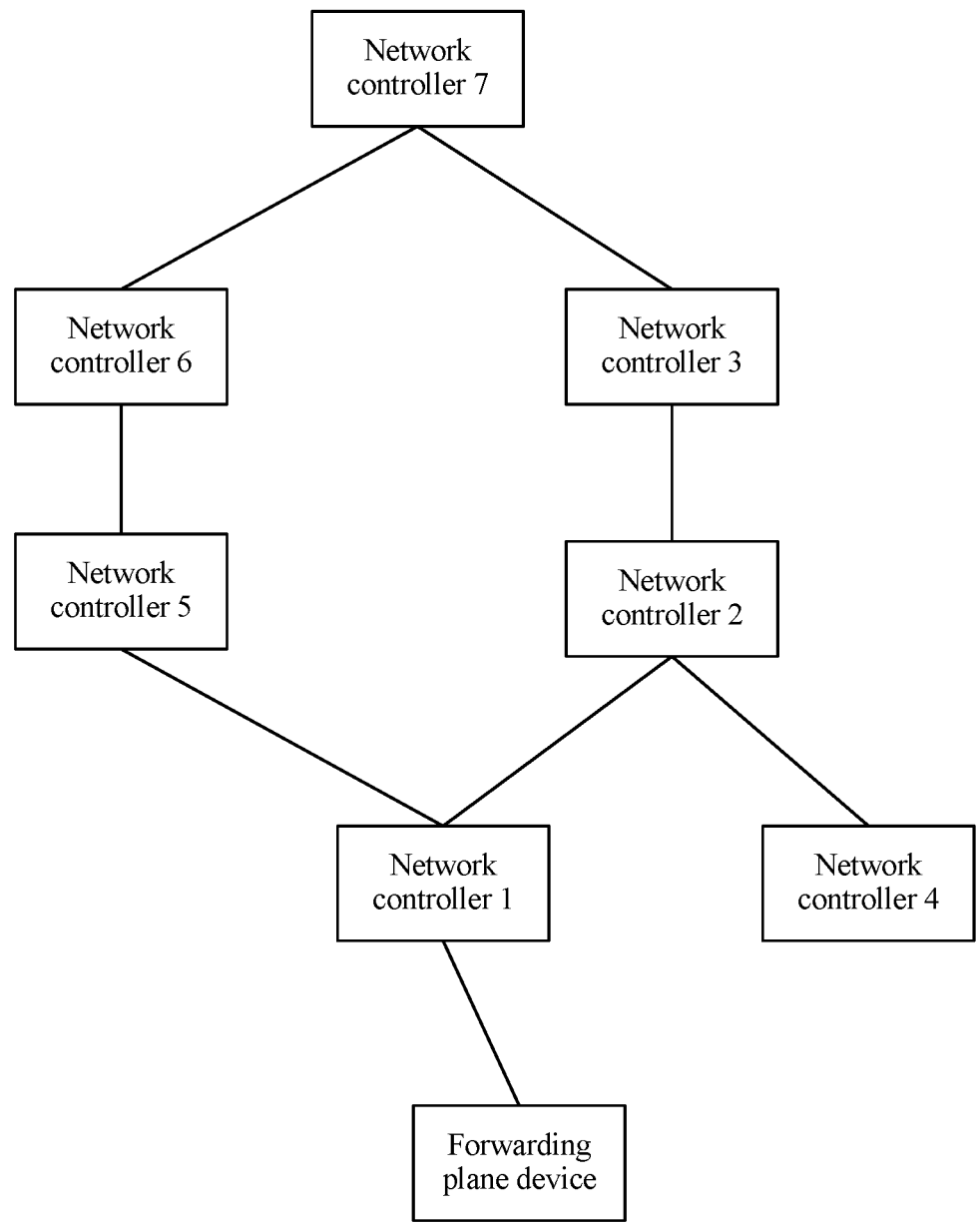
FIG. 4B is a schematic structural diagram of a topology of network controllers to implement a network control method according to an embodiment of the present invention.

To describe the method embodiments shown in FIG. 2 and FIG. 3 in detail, a general procedure of the network control method is described with reference to FIG. 4A and FIG. 4B. FIG. 4A is a signaling flowchart of a network control method according to an embodiment of the present invention. FIG. 4B is a schematic structural diagram of a topology of network controllers to implement a network control method according to an embodiment of the present invention. FIG. 4B shows a relationship between network controllers in FIG. 4A. Referring to FIG. 4B, a network controller 1 and a network controller 4 are sub network controllers of a network controller 2; the network controller 2 is a primary network controller of the network controller 1 and the network controller 4; a network controller 5 is a secondary network controller of the network controller 1; the network controller 2 and the network controller 5 are at a same level; a network controller 3 is a primary network controller of the network controller 2; a network controller 6 is a primary network controller of the network controller 5; the network controller 3 and the network controller 6 are at a same level; and an upper-level network controller of the network controller 3 and the network controller 6 is a network controller 7. Referring to FIG. 4A, the method in this embodiment includes the following steps:

401. The network controller 1 receives a request message of a forwarding plane device, where the request message includes information that is used to indicate a network event and information that is used to instruct to request a processing policy of the network event, and the first network controller is a primary network controller of the forwarding plane device.

402. The network controller 1 determines whether the network controller 1 can provide the processing policy. If the network controller 1 can provide the processing policy, step 413 is performed; or if the network controller 1 cannot provide the processing policy, step 403 is performed.

403. The network controller 1 sends the request message to a network controller 2.

The network controller 1 sends the request message to the network controller 2, so that the network controller 2 determines whether the network controller 2 can provide the processing policy.

It should be noted that although the network controller 1 is used as the sub network controller of the network controller 2, if no request message report mechanism is configured for the network controller 1, a local default configuration is used. For example, the request message is directly discarded.

404. The network controller 2 determines whether the network controller 2 can provide the processing policy. If the network controller 2 can provide the processing policy, step 405 is performed; or if the network controller 2 cannot provide the processing policy, step 406 is performed.

405. The network controller 2 sends the processing policy to the network controller 1. Then step 413 is performed.

406. The network controller 2 sends the request message to a network controller 4.

It should be noted that the network controller 2 stores information used to identify a network function supported by the network controller 4. Therefore, if the network controller 2 determines that the network controller 2 itself cannot provide the processing policy, if the network controller 2 determines that the network controller 4 can provide the processing policy, the network controller 2 may send the request message to the network controller 4, and then step 407 is performed. If neither the network controller 4 nor another sub network controller of the network controller 2 can provide the processing policy, and an upper-level network controller is configured for the network controller 2, the request message may be uploaded to the upper-level network controller of the network controller 2. For example, in this embodiment, the network controller 3 is the upper-level network controller of the network controller 2, and is the primary network controller of the network controller 2. If the network controller 2 determines that neither the network controller 2 itself nor each sub network controller of the network controller 2 can provide the processing policy, step 408 is performed.

407. The network controller 4 sends the processing policy to the network controller 2.

After the network controller 4 sends the processing policy to the network controller 2, the network controller 2 sends the processing policy to the network controller 1, and then step 413 is performed.

408. The network controller 2 sends the request message to a network controller 3.

The network controller 2 sends the request message to the network controller 3, so that the network controller 3 provides the processing policy to the network controller 2. The network controller 3 determines whether the network controller 3 itself can provide the processing policy. If the network controller 3 can provide the processing policy, step 409 is performed; or if the network controller 3 cannot provide the processing policy, step 410 is performed.

By using steps 401-408, a network controller may request a processing policy from an upper-level network controller of the network controller or a sub network controller of the network controller when the network controller itself cannot provide the processing policy, so that a problem in the prior art is avoided that excessive application programs are installed on a network controller and consequently bring extremely high running overheads to the network controller and easily cause a bottleneck in a control plane, computation processing overheads of each network controller are reduced, and network scalability is improved.

409. The network controller 3 sends the processing policy to the network controller 2.

The network controller 3 sends the processing policy to the network controller 2. After receiving the processing policy sent by the network controller 3, the network controller 2 sends the processing policy to the network controller 1, and then step 413 is performed.

410. The network controller 3 sends a reject message to the network controller 2. Then step 411 is performed.

411. The network controller 2 sends the reject message to the network controller 1.

The network controller 2 sends the reject message to the network controller 1. After the network controller 1 receives the reject message sent by the network controller 2, step 412 is performed.

412. The network controller 1 sends the request message to a network controller 5.

The network controller 5 determines whether the network controller 5 can provide the processing policy. If the network controller 5 can provide the processing policy, the network controller 5 sends the processing policy to the network controller 1, and then step 413 is performed. If the network controller 5 cannot provide the processing policy, the network controller 5 sends the reject message to the network controller 1. If the request message report mechanism is configured for the network controller 5, and if the network controller 5 cannot provide the processing policy, the network controller 5 may send the request message to the network controller 6. A processing method of the network controller 6 is similar to that of the network controller 5. If the network controller 6 cannot provide the processing policy, the network controller 6 sends the request message to the network controller 7. If the network controller 7 cannot provide the processing policy, and no upper-level network controller is configured for the network controller 7, the request message is discarded.

It should be noted that if the network controller 1 further has another secondary network controller, and if the network controller 1 receives the reject message sent by the network controller 5, the network controller 1 may further send the request message to the another secondary network controller, so as to obtain the processing policy.

413. The network controller 1 sends the processing policy to the forwarding plane device.

According to the network control method provided in this embodiment, if a network controller itself cannot provide a processing policy, the network controller may request the processing policy from an upper-level network controller of the network controller or a sub network controller of the network controller. Therefore, a problem in the prior art is resolved that excessive application programs that can implement network functions are installed on a network controller and an SDN domain controller in a centralized deployment manner, and consequently bring extremely high running overheads to the SDN domain controller and the network controller and easily cause a bottleneck in control. In a hierarchical network deployment manner, different network functions are separately undertaken by using different network controllers, and if a network controller itself cannot provide a processing policy of processing a network event, the network controller may request the processing policy from an upper-level network controller, which reduces computation processing overheads of each network controller, and improves network scalability.

Figure 5:
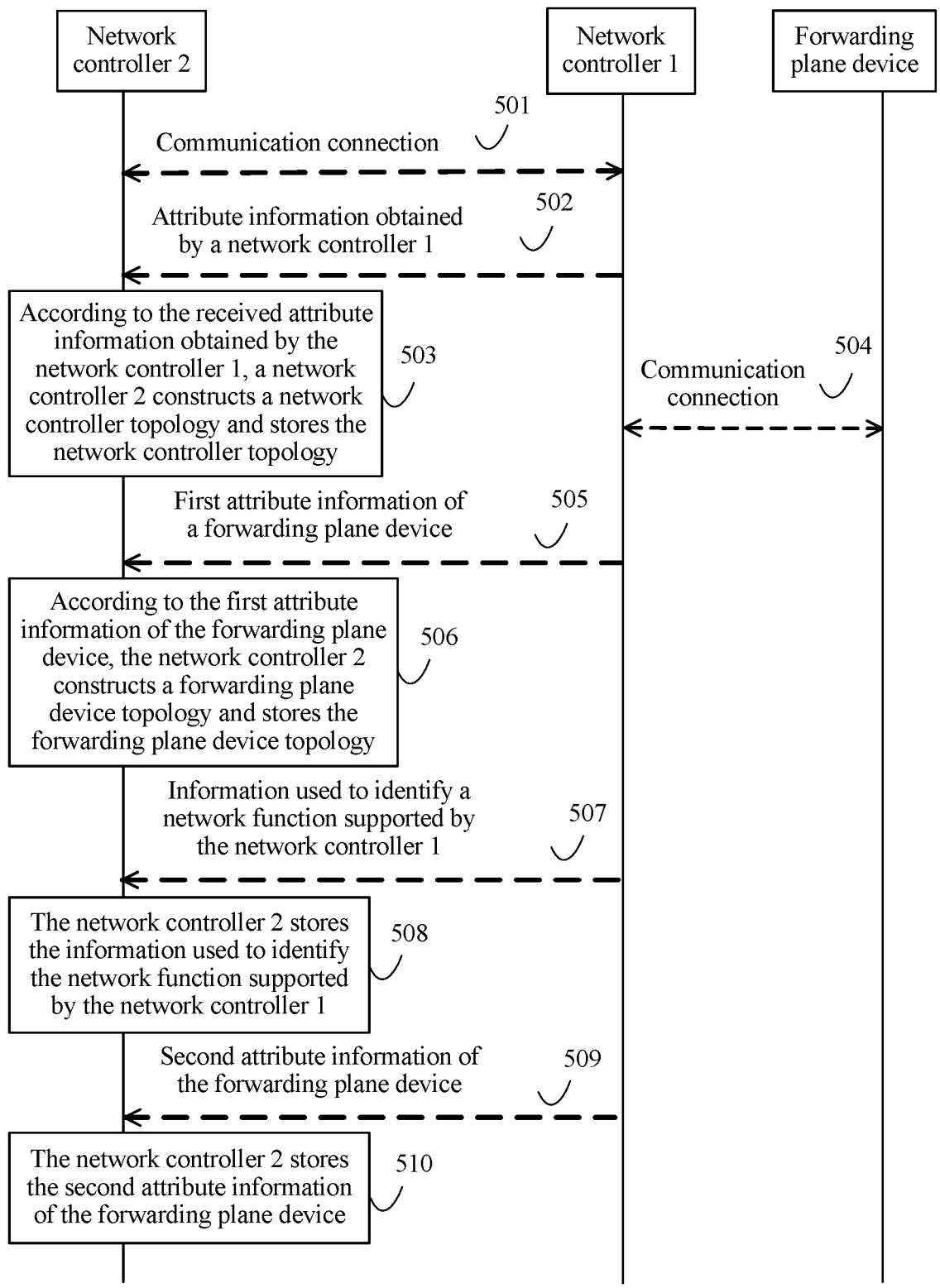
FIG. 5 is a signaling flowchart of establishing a communication connection between network controllers and a communication connection between a network controller and a forwarding plane device according to an embodiment of the present invention.

Before a signaling procedure shown in FIG. 4A is performed, a communication connection between network controllers and a communication connection between a network controller and a forwarding plane device need to be established. In this embodiment, a process of establishing the communication connection between the network controllers and the communication connection between the network controller and the forwarding plane device is described with reference to FIG. 5. FIG. 5 is a signaling flowchart of establishing a communication connection between network controllers and a communication connection between a network controller and a forwarding plane device according to an embodiment of the present invention. Referring to FIG. 5, the method in this embodiment includes the following steps.

501. A network controller 2 establishes a communication connection with a network controller 1.

In a process of establishing the communication connection between the network controller 1 and the network controller 2, the established communication connection may be a single connection, that is, all services perform communication by using one transmission channel; or the established communication connection may be a multi-connection, that is, different services perform communication by using different transmission channels, and the different transmission channels separately carry different data services between the network controller 2 and the network controller 1.

502. The network controller 2 receives attribute information obtained and sent by the network controller 1.

The attribute information obtained by the network controller 1 includes attribute information of the network controller 1, or attribute information of the network controller 1 and attribute information of a network controller communicatively connected to the network controller 1. The attribute information of the network controller 1 includes at least one of an identifier of the network controller 1, information used to identify a role of the network controller 1, or information used to identify a feature of the network controller 1. The information used to identify the role of the network controller 1 may be information used to identify whether the network controller has a sub controller, or may be information of identifying a role of the network controller 1 to the forwarding plane device. The role of the network controller 1 to the forwarding plane device may be a primary network controller of the forwarding plane device or a secondary network controller of the forwarding plane device by classification. The information used to identify the feature of the network controller 1 may be an IP address of the network controller 1, a port number of the network controller 1, or a MAC address of the network controller 1. The attribute information of the network controller communicatively connected to the network controller 1 includes at least one of an identifier of a network controller at a same level with the network controller 1 and communicatively connected to the network controller 1, information used to identify a role of the network controller at the same level with the network controller 1 and communicatively connected to the network controller 1, or information used to identify a feature of the network controller communicatively connected to the network controller 1.

503. According to the received attribute information obtained by the network controller 1, the network controller 2 constructs a network controller topology and stores the network controller topology.

504. The network controller 1 establishes a communication connection with a forwarding plane device.

After the network controller 1 establishes the communication connection with the forwarding plane device, the network controller 1 may obtain first attribute information of the forwarding plane device.

505. The network controller 1 sends first attribute information of the forwarding plane device to the network controller 2.

506. According to the first attribute information of the forwarding plane device, the network controller 2 constructs a forwarding plane device topology and stores the forwarding plane device topology.

That the network controller 2 receives the first attribute information of the forwarding plane device sent by the network controller 1 may be implemented in the following manners: The network controller 2 may send a message for requesting the first attribute information of the forwarding plane device to the network controller 1, and the network controller 1 sends the first attribute information of the forwarding plane device to the network controller 2 after receiving the message; or the network controller 1 actively sends the first attribute information of the forwarding plane device to the network controller 2.

It should be noted that if the network controller 2 does not show the controller role to the forwarding plane device, by using step 505, the network controller 2 can receive the first attribute information of the forwarding plane device sent by the network controller 1. If the network controller 1 is a newly added network controller, the network controller 1 may establish a communication connection with the forwarding plane device, obtain the first attribute information of the forwarding plane device, and send the first attribute information of the forwarding plane device to the network controller 2. If the network controller 2 shows the controller role to the forwarding plane device, the network controller 2 can directly establish a communication connection with the forwarding plane device, and obtain the first attribute information of the forwarding plane device.

The first attribute information of the forwarding plane device includes at least one of an identifier, a port number, a port Media Access Control (MAC for short) address, a port Internet Protocol (IP for short) address, a virtual local area network (VLAN for short), bandwidth, a computing capability, or a link feature of the forwarding plane device. The link feature includes at least one of a device identification number, a port number, a MAC address, or an IP address of a peer device connected to the forwarding device.

507. The network controller 2 receives information that is sent by the network controller 1 and that is used to identify a network function supported by the network controller 1.

That the network controller 2 receives the identification information that is sent by the network controller 1 and that is used to identify the network function supported by the network controller 1 may be implemented in the following manners: The network controller 2 may send a message for requesting the information used to identify the network function supported by the network controller 1 to the network controller 1, and after receiving the message, the network controller 1 sends the information used to identify the network function supported by the network controller 1 to the network controller 2; or the network controller 1 actively sends the information used to identify the network function supported by the network controller 1 to the network controller 2.

The information for identifying the network function supported by the network controller 1 may be an identifier of an application program installed on the network controller 1, or may be other information used to identify the network function, for example, user-defined vendor identification information.

508. The network controller 2 stores the information used to identify the network function supported by the network controller 1.

After the network controller 2 stores the information about the network function supported by the network controller 1, and after receiving a request message, if the network controller 2 can determine, according to the information that is about the network function supported by the network controller 1 and that is stored by the network controller 2, whether a sub network controller (the network controller 1) of the network controller 2 can provide a processing policy, if the network controller 2 determines that the network controller 1 can provide the processing policy, the network controller 2 may send the request message to the network controller 1 to request the processing policy.

509. The network controller 2 receives second attribute information of the forwarding plane device sent by the network controller 1.

That the network controller 2 receives the second attribute information of the forwarding plane device sent by the network controller 1 may be implemented in the following manners: the network controller 2 may send a message for requesting the second attribute information of the forwarding plane device to the network controller 1, and the network controller 1 sends the second attribute information of the forwarding plane device to the network controller 2 after receiving the message; or the network controller 1 actively sends the second attribute information of the forwarding plane device to the network controller 2.

It should be noted that if the network controller 2 does not show the controller role to the forwarding plane device, by using step 509, the network controller 2 can receive the first attribute information of the forwarding plane device sent by the network controller 1. If the network controller 1 is a newly added network controller, the network controller 1 may establish a communication connection with the forwarding plane device, obtain the first attribute information of the forwarding plane device, and send the first attribute information of the forwarding plane device to the network controller 2. If the network controller 2 shows the controller role to the forwarding plane device, the network controller 2 can directly establish a communication connection with the forwarding plane device, and obtain the second attribute information of the forwarding plane device.

The second attribute information of the forwarding plane device includes at least one of flow table information of the forwarding plane device, status information of a link between forwarding plane devices, or data caching information of the forwarding plane device, where the status information of the link between the forwarding plane devices may include a congestion status of the link between the forwarding plane devices, and a connection status (connected or disconnected) of the link between the forwarding plane devices.

510. The network controller 2 stores the second attribute information of the forwarding plane device.

After storing the second attribute information of the forwarding plane device, the network controller 2 may select, according to the second attribute information of the forwarding plane device, a path in a connected state and with light link load to send the processing policy.

It should be noted that the foregoing steps 501-510 are a data path establishment procedure among the network controller 2, the network controller 1, and the forwarding plane device, where the network controller 2 is a primary network controller of the network controller 1. A data path establishment process among the network controller 1, the network controller 5 (the network controller 5 is a secondary network controller of the network controller 1), and the forwarding plane device is the same as the foregoing 501-510. According to the first attribute information of the forwarding plane device, the network controller 5 also needs to construct the forwarding plane device topology and store the forwarding plane device topology, store the forwarding plane device topology, store the information used to identify the network function supported by the network controller 1, and store the second attribute information of the forwarding plane device.

According to the network control method provided in this embodiment, before a network controller 1 receives a request message, a communication connection is first established between the network controller 1, a network controller 2, and a forwarding plane device. Therefore, a problem in the prior art is resolved that excessive application programs that can implement network functions are installed on a network controller and an SDN domain controller in a centralized deployment manner, and consequently bring extremely high running overheads to the SDN domain controller and the network controller and easily cause a bottleneck in a control plane. In a hierarchical network deployment manner, different network functions are separately undertaken by using different network controllers, and if a network controller itself cannot provide a processing policy of processing a network event, the network controller may request the processing policy from an upper-level network controller of the network controller or a sub network controller of the network controller, which reduces computation processing overheads of each network controller, and improves network scalability.

Figure 6A:
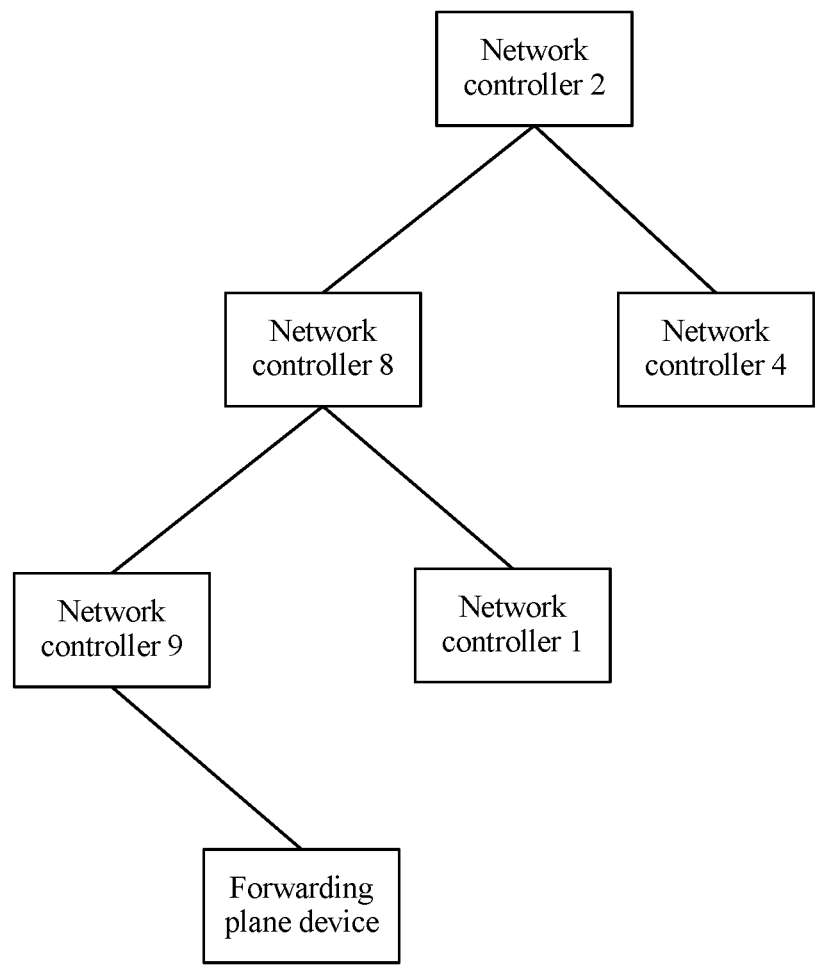
FIG. 6A is a schematic structural diagram of a topology obtained after a layer of network controllers are added according to an embodiment of the present invention.
Figure 6B:
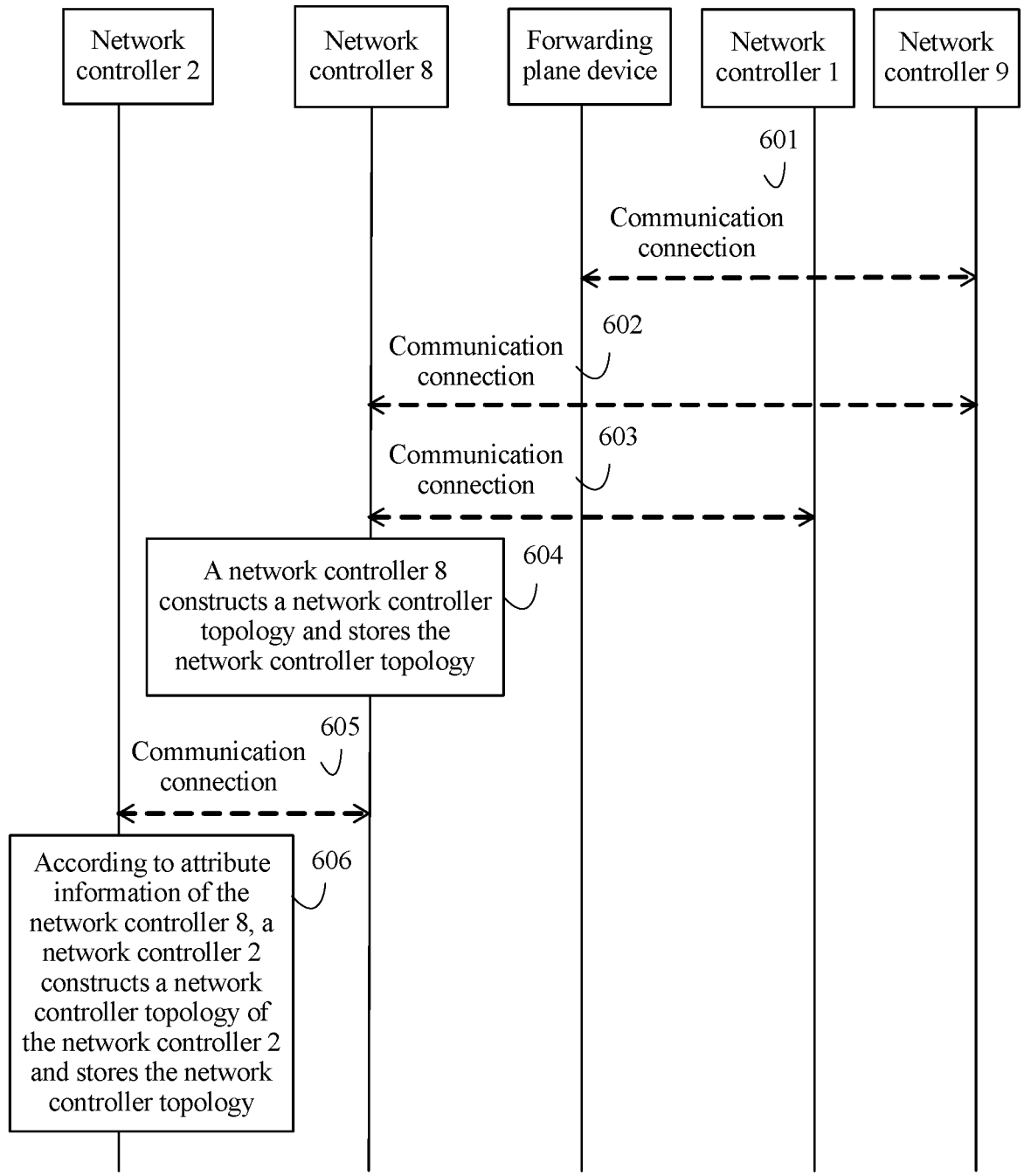
FIG. 6B is a signaling flowchart of establishing a communication connection between network controllers according to an embodiment of the present invention.

If an existing topology structure in a network is shown in FIG. 4B, if expansion needs to be performed on a network control architecture, and a new layer of network controllers are added to an architecture show in FIG. 4B, an expanded topology structure is shown in FIG. 6A. FIG. 6A is a schematic structural diagram of a topology obtained after a layer of network controllers are added according to an embodiment of the present invention. FIG. 6A shows only a schematic topological diagram of a network controller 1, a network controller 2, a network controller 4, a newly added network controller 8, and a newly added network controller 9. Referring to FIG. 6A, the network controller 2 in FIG. 6A is an upper-level network controller of the network controller 8 and the network controller 4, and lower-level network controllers of the network controller 8 are the network controller 1 and the network controller 9. After the network controller 8 and the network controller 9 are newly added, a communication connection separately between the network controller 8 and the network controller 1, the network controller 2, and the network controller 9 needs to be established. Referring to FIG. 6B, FIG. 6B is a signaling flowchart of establishing a communication connection between network controllers according to an embodiment of the present invention. A specific implementation process of establishing a communication connection separately between the network controller 8 and the network controller 1, the network controller 2, and the network controller 9, and a communication connection between the network controller 9 and a forwarding plane device includes the following steps:

601. The network controller 9 establishes a communication connection with the forwarding plane device, and obtains first attribute information of the forwarding plane device.

602. A network controller 8 establishes a communication connection with the network controller 9, and receives attribute information of the network controller 9 sent by the network controller 9.

It should be noted that if the newly added network controller 8 also shows a network controller role to the forwarding plane device, a secure channel between the network controller 8 and the forwarding plane device needs to be established, and the network controller 8 may obtain the first attribute information of the forwarding plane device. If the newly added network controller 8 does not show the network controller role to the forwarding plane device, the first attribute information of the forwarding plane device may be sent to the network controller 8 after the network controller 9 obtains the first attribute information of the forwarding plane device.

603. The network controller 8 establishes a communication connection with the network controller 1, and receives attribute information of the network controller 1 sent by the network controller 1.

604. The network controller 8 constructs a network controller topology and stores the network controller topology.

It should be noted that according to the received attribute information of the network controller 1 and the received attribute information of the network controller 9, the network controller 8 can construct the network controller topology of the network controller 8 and store the network controller topology.

605. The network controller 8 establishes a communication connection with the network controller 2, and sends attribute information of the network controller 8 to the network controller 2.

606. According to the attribute information of the network controller 8, the network controller 2 constructs a network controller topology of the network controller 2 and stores the network controller topology.

According to the network control method provided in this embodiment, a network controller is newly added to an existing network architecture, and a communication connection separately between the newly added network controller, a network controller in the existing network architecture, and a forwarding plane device is established. A new network function may be deployed on the newly added network controller. Therefore, a problem in the prior art is resolved that excessive application programs that can implement network functions are installed on a network controller and an SDN domain controller in a centralized deployment manner, and consequently bring extremely high running overheads to the SDN domain controller and the network controller and easily cause a bottleneck in control. In a hierarchical deployment manner, different network functions are separately undertaken by using different network controllers, so that the newly added network controller can undertake some network functions, thereby reducing computation processing overheads of each network controller, and improving network scalability.

Figure 7:
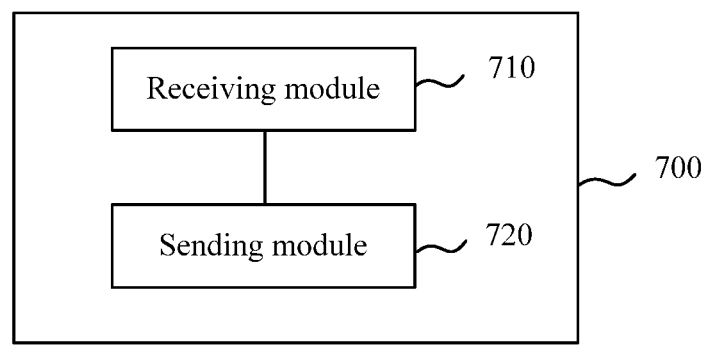
FIG. 7 is a schematic structural diagram of a network control apparatus 700 according to an embodiment of the present invention.

FIG. 7 is a schematic structural diagram of a network control apparatus 700 according to an embodiment of the present invention. The apparatus in this embodiment is applicable to a case in which a hierarchical network deployment manner is used to simplify computation processing overheads of each network controller and improve network control scalability. The apparatus is generally implemented in a hardware and/or software manner. Referring to FIG. 7, the apparatus includes the following modules: a receiving module 710 and a sending module 720.

The receiving module 710 is configured to receive a request message of a forwarding plane device, where the request message includes information that is used to indicate a network event and information that is used to instruct to request a processing policy of the network event. The sending module 720 is configured to: if a first network controller determines, according to the request message, that the first network controller cannot provide the processing policy, send the request message to a second network controller, so as to request the second network controller to provide the processing policy to the first network controller, where the first network controller is a primary network controller of the forwarding plane device. The receiving module 710 is further configured to receive the processing policy sent by the second network controller. The sending module 720 is further configured to send the received processing policy to the forwarding plane device.

Further, the sending module 720 is specifically configured to: send the request message to a primary network controller of the first network controller; and if the primary network controller of the first network controller determines, according to the request message, that the primary network controller of the first network controller cannot provide the processing policy, send the request message to the second network controller by using the primary network controller of the first network controller, where the second network controller is an upper-level network controller of the primary network controller of the first network controller or a sub network controller of the primary network controller of the first network controller.

Further, the sending module 720 is further configured to: send the request message to a primary network controller of the first network controller before sending the request message to the second network controller; and if the primary network controller of the first network controller determines, according to the request message, that the primary network controller of the first network controller cannot provide the processing policy, receive a reject message sent by the primary network controller of the first network controller to reject sending the processing policy to the first network controller.

The sending module 720 is specifically configured to send the request message to the second network controller according to the received reject message, where the second network controller is a secondary network controller of the first network controller, and the secondary network controller of the first network controller is at a same level with the primary network controller of the first network controller.

Further, the receiving module 710 is specifically configured to: if the second network controller determines, according to the request message, that the second network controller can provide the processing policy, receive the processing policy sent by the second network controller according to the received request message, where the second network controller is a primary network controller of the first network controller.

Further, the apparatus further includes: a processing module, configured to: before the first network controller receives the request message of the forwarding plane device, establish a communication connection with the forwarding plane device; and obtain first attribute information of the forwarding plane device.

The sending module 720 is further configured to send the first attribute information of the forwarding plane device to the second network controller, so that according to the first attribute information of the forwarding plane device, the second network controller constructs a forwarding plane device topology and stores the forwarding plane device topology.

Further, the first attribute information of the forwarding plane device includes at least one of an identifier, a port number, a port Media Access Control MAC address, a port Internet Protocol IP address, a virtual local area network VLAN, bandwidth, a computing capability, or a link feature of the forwarding plane device; and the link feature includes at least one of a device identification number, a port number, a MAC address, or an IP address of a peer device connected to the forwarding plane device.

Further, the sending module 720 is further configured to send information used to identify a network function supported by the first network controller to the second network controller, so that the second network controller stores the information used to identify the network function supported by the first network controller.

Further, the sending module 720 is further configured to send second attribute information of the forwarding plane device to the second network controller, so that the second network controller stores the second attribute information of the forwarding plane device, where the second attribute information includes at least one of flow table information of the forwarding plane device, status information of a link between the forwarding plane devices, or data caching information of the forwarding plane device.

Further, the processing module is further configured to: before the first network controller sends the request message to the second network controller, establish a communication connection with the second network controller.

The sending module 720 is configured to send attribute information obtained by the first network controller to the second network controller, so that according to the attribute information obtained by the first network controller, the second network controller constructs a network controller topology and stores the network controller topology.

The attribute information obtained by the first network controller includes: attribute information of the first network controller, or attribute information of the first network controller and attribute information of a network controller communicatively connected to the first network controller.

Further, the attribute information of the first network controller includes at least one of an identifier of the first network controller, information used to identify a role of the first network controller, or information used to identify a feature of the first network controller.

The attribute information of the network controller communicatively connected to the first network controller includes at least one of an identifier of a network controller at a same level with the first network controller and communicatively connected to the first network controller, information used to identify a role of the network controller at the same level with the first network controller and communicatively connected to the first network controller, or information used to identify a feature of the network controller communicatively connected to the first network controller.

According to the network control apparatus provided in this embodiment, a request message of a forwarding plane device is received; and if the first network controller determines, according to the request message, that the first network controller cannot provide the processing policy, the first network controller sends the request message to a second network controller, receives the processing policy sent by the second network controller, and sends the received processing policy to the forwarding plane device. Therefore, a problem in the prior art is resolved that excessive application programs that can implement network functions are installed on a network controller and an SDN domain controller in a centralized deployment manner, and consequently bring extremely high running overheads to the SDN domain controller and the network controller and easily cause a bottleneck in control. In a hierarchical network deployment manner, different network functions are separately undertaken by using different network controllers, and if a network controller itself cannot provide a processing policy of processing a network event, the network controller may request the processing policy from another network controller, which reduces computation processing overheads of each network controller, and improves network scalability.

Referring to FIG. 7, a schematic structural diagram of a network control apparatus provided in this embodiment is the same as FIG. 7. In this embodiment, the apparatus is applicable to a case in which a hierarchical network deployment manner is used to simplify computation processing overheads of each network controller and improve network control scalability. The apparatus is generally implemented in a hardware and/or software manner.

A receiving module is configured to receive a request message sent by a first network controller, where the request message includes a network event, and is used to request a processing policy of the network event, and the request message is sent to a second network controller by the first network controller after the first network controller receives the request message sent by a forwarding plane device or a lower-level network controller of the first network controller and determines, according to the request message, that the first network controller cannot provide the processing policy. A sending module is configured to send the processing policy to the first network controller, so that the first network controller sends the processing policy to the forwarding plane device or the lower-level network controller of the first network controller.

Further, that the request message is sent to a second network controller by the first network controller after the first network controller receives the request message sent by a forwarding plane device or a lower-level network controller of the first network controller and determines, according to the request message, that the first network controller cannot provide the processing policy includes: the request message is sent to a primary network controller of the first network controller by the first network controller after the first network controller receives the request message sent by the forwarding plane device or the lower-level network controller of the first network controller and determines, according to the request message, that the first network controller cannot provide the processing policy, and is sent to the second network controller by the first network controller by using the primary network controller of the first network controller if the primary network controller of the first network controller determines, according to the request message, that the primary network controller of the first network controller cannot provide the processing policy; where the second network controller is an upper-level network controller of the primary network controller of the first network controller or a sub network controller of the primary network controller of the first network controller.

The receiving module is specifically configured to receive the request message sent by the first network controller by using the primary network controller of the first network controller.

Further, that the request message is sent to a second network controller by the first network controller after the first network controller receives the request message sent by a forwarding plane device or a lower-level network controller of the first network controller and determines, according to the request message, that the first network controller cannot provide the processing policy includes: the request message is sent to a primary network controller of the first network controller by the first network controller after the first network controller receives the request message sent by the forwarding plane device or the lower-level network controller of the first network controller, and is sent to the second network controller by the first network controller after the primary network controller of the first network controller determines, according to the request message, that the primary network controller of the first network controller cannot provide the processing policy, and sends a reject message to the first network controller, where the second network controller is a secondary network controller of the first network controller, and the secondary network controller of the first network controller is at a same level with the primary network controller of the first network controller.

Further, the apparatus further includes: a processing module, configured to: before the second network controller sends the processing policy to the first network controller, determine, according to the request message, that the second network controller can provide the processing policy, where the second network controller is the primary network controller of the first network controller.

Further, the processing module is further configured to: before the request message sent by the first network controller is received, establish a communication connection with the first network controller.

The receiving module is further configured to receive attribute information obtained and sent by the first network controller.

The processing module is further configured to: according to the received attribute information obtained by the first network controller, construct a network controller topology and store the network controller topology.

The attribute information obtained by the first network controller includes: attribute information of the first network controller, or attribute information of the first network controller and attribute information of a network controller communicatively connected to the first network controller.

Further, the attribute information of the first network controller includes at least one of an identifier of the first network controller, information used to identify a role of the first network controller, or information used to identify a feature of the first network controller.

The attribute information of the network controller communicatively connected to the first network controller includes at least one of an identifier of a network controller at a same level with the first network controller and communicatively connected to the first network controller, information used to identify a role of the network controller at the same level with the first network controller and communicatively connected to the first network controller, or information used to identify a feature of the network controller communicatively connected to the first network controller.

Further, the receiving module is further configured to: after a first topology is constructed and the first topology is stored according to the received attribute information of the first network controller, receive first attribute information of the forwarding plane device sent by the first network controller; and store the first attribute information of the forwarding plane device.

Further, the first attribute information of the forwarding plane device includes at least one of an identifier, a port number, a port Media Access Control MAC address, a port Internet Protocol IP address, a virtual local area network VLAN, bandwidth, a computing capability, or a link feature of the forwarding plane device; and the link feature includes at least one of a device identification number, a port number, a MAC address, or an IP address of a peer device connected to the forwarding plane device.

Further, the receiving module is further configured to receive information that is sent by the first network controller and that is used to identify a network function supported by the first network controller; and store the information used to identify the network function supported by the first network controller.

Further, the receiving module is further configured to receive second attribute information of the forwarding plane device sent by the first network controller; and store the second attribute information of the forwarding plane device.

Further, the second attribute information of the forwarding plane device includes at least one of flow table information of the forwarding plane device, status information of a link between the forwarding plane devices, or data caching information of the forwarding plane device.

According to the network control apparatus provided in this embodiment, different functions are deployed on different network controllers; and if a first network controller itself cannot provide a processing policy, the first network controller may request the processing policy from another network controller. Therefore, a problem in the prior art is resolved that excessive application programs that can implement network functions are installed on a network controller and an SDN domain controller in a centralized deployment manner, and consequently bring extremely high running overheads to the SDN domain controller and the network controller and easily cause a bottleneck in a control plane. In a network deployment manner, different network functions are separately undertaken by using different network controllers, and if a network controller itself cannot provide a processing policy of processing a network event, the network controller may request the processing policy from another network controller, which reduces computation processing overheads of each network controller, and improves network scalability.

Figure 8:
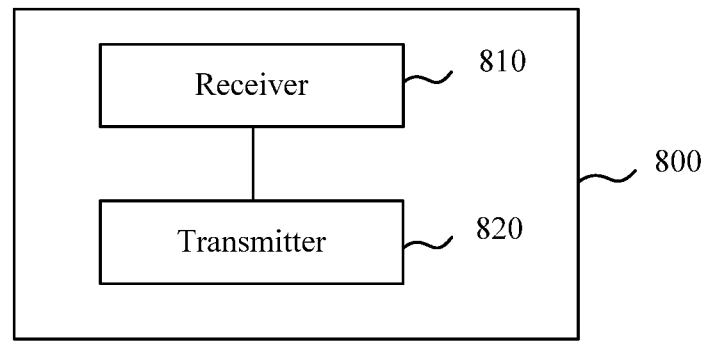
FIG. 8 is a schematic structural diagram of another network control apparatus 800 according to an embodiment of the present invention.

FIG. 8 is a schematic structural diagram of another network control apparatus 800 according to an embodiment of the present invention. The apparatus in this embodiment is applicable to a case in which a hierarchical network deployment manner is used to simplify computation processing overheads of each network controller and improve network control scalability. The apparatus is generally implemented in a hardware and/or software manner. Referring to FIG. 8, the apparatus includes a receiver 810 and a transmitter 820.

The receiver 810 is configured to receive a request message of a forwarding plane device, where the request message includes information that is used to indicate a network event and information that is used to instruct to request a processing policy of the network event. The transmitter 820 is configured to: if a first network controller determines, according to the request message, that the first network controller cannot provide the processing policy, send the request message to a second network controller, so as to request the second network controller to provide the processing policy to the first network controller, where the first network controller is a primary network controller of the forwarding plane device. The receiver 810 is further configured to receive the processing policy sent by the second network controller. The transmitter 820 is further configured to send the received processing policy to the forwarding plane device.

Further, the transmitter 820 is specifically configured to: send the request message to a primary network controller of the first network controller; and if the primary network controller of the first network controller determines, according to the request message, that the primary network controller of the first network controller cannot provide the processing policy, send the request message to the second network controller by using the primary network controller of the first network controller, where the second network controller is an upper-level network controller of the primary network controller of the first network controller or a sub network controller of the primary network controller of the first network controller.

Further, the transmitter 820 is further configured to: send the request message to a primary network controller of the first network controller before sending the request message to the second network controller; and if the primary network controller of the first network controller determines, according to the request message, that the primary network controller of the first network controller cannot provide the processing policy, receive a reject message sent by the primary network controller of the first network controller to reject sending the processing policy to the first network controller.

The transmitter 820 is specifically configured to send the request message to the second network controller according to the received reject message, where the second network controller is a secondary network controller of the first network controller, and the secondary network controller of the first network controller is at a same level with the primary network controller of the first network controller.

Further, the receiver 810 is specifically configured to: if the second network controller determines, according to the request message, that the second network controller can provide the processing policy, receive the processing policy sent by the second network controller according to the received request message, where the second network controller is a primary network controller of the first network controller.

Further, the apparatus further includes: a processor, configured to: before the first network controller receives the request message of the forwarding plane device, establish a communication connection with the forwarding plane device; and obtain first attribute information of the forwarding plane device.

The transmitter 820 is further configured to send the first attribute information of the forwarding plane device to the second network controller, so that according to the first attribute information of the forwarding plane device, the second network controller constructs a forwarding plane device topology and stores the forwarding plane device topology.

Further, the first attribute information of the forwarding plane device includes at least one of an identifier, a port number, a port Media Access Control MAC address, a port Internet Protocol IP address, a virtual local area network VLAN, bandwidth, a computing capability, or a link feature of the forwarding plane device; and the link feature includes at least one of a device identification number, a port number, a MAC address, or an IP address of a peer device connected to the forwarding plane device.

Further, the transmitter 820 is further configured to send information used to identify a network function supported by the first network controller to the second network controller, so that the second network controller stores the information used to identify the network function supported by the first network controller.

Further, the transmitter 820 is further configured to send second attribute information of the forwarding plane device to the second network controller, so that the second network controller stores the second attribute information of the forwarding plane device, where the second attribute information includes at least one of flow table information of the forwarding plane device, status information of a link between the forwarding plane devices, or data caching information of the forwarding plane device.

Further, the processor is further configured to: before the first network controller sends the request message to the second network controller, establish a communication connection with the second network controller.

The transmitter 820 is configured to send attribute information obtained by the first network controller to the second network controller, so that according to the attribute information obtained by the first network controller, the second network controller constructs a network controller topology and stores the network controller topology.

The attribute information obtained by the first network controller includes: attribute information of the first network controller, or attribute information of the first network controller and attribute information of a network controller communicatively connected to the first network controller.

Further, the attribute information of the first network controller includes at least one of an identifier of the first network controller, information used to identify a role of the first network controller, or information used to identify a feature of the first network controller.

The attribute information of the network controller communicatively connected to the first network controller includes at least one of an identifier of a network controller at a same level with the first network controller and communicatively connected to the first network controller, information used to identify a role of the network controller at the same level with the first network controller and communicatively connected to the first network controller, or information used to identify a feature of the network controller communicatively connected to the first network controller.

According to the network control apparatus provided in this embodiment, a request message of a forwarding plane device is received; and if the first network controller determines, according to the request message, that the first network controller cannot provide the processing policy, the first network controller sends the request message to a second network controller, receives the processing policy sent by the second network controller, and sends the received processing policy to the forwarding plane device. Therefore, a problem in the prior art is resolved that excessive application programs that can implement network functions are installed on a network controller and an SDN domain controller in a centralized deployment manner, and consequently bring extremely high running overheads to the SDN domain controller and the network controller and easily cause a bottleneck in control. In a hierarchical network deployment manner, different network functions are separately undertaken by using different network controllers, and if a network controller itself cannot provide a processing policy of processing a network event, the network controller may request the processing policy from another network controller, which reduces computation processing overheads of each network controller, and improves network scalability.

It should be noted that the network control apparatus provided in this embodiment may be configured to execute technical solutions of the method embodiment shown in FIG. 2.

It should be understood that in this embodiment of the present invention, the processor may be a central processing unit (CPU for short), and the processor may also be another general processor, a digital signal processor (DSP), an application-specific integrated circuit (ASIC), a field-programmable gate array (FPGA) or another programmable logical device, a discrete gate or a transistor logic device, a discrete hardware component, or the like. The general processor may be a microprocessor or the processor may also be any conventional processor, or the like.

In an implementation process, the foregoing steps may be completed by using an integrated logic circuit of hardware in the processor or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

Referring to FIG. 8, a schematic structural diagram of a network control apparatus provided in this embodiment is the same as FIG. 8. In this embodiment, the apparatus is applicable to a case in which a hierarchical network deployment manner is used to simplify computation processing overheads of each network controller and improve network control scalability. The apparatus is generally implemented in a hardware and/or software manner.

A receiver is configured to receive a request message sent by a first network controller, where the request message includes a network event, and is used to request a processing policy of the network event, and the request message is sent to a second network controller by the first network controller after the first network controller receives the request message sent by a forwarding plane device or a lower-level network controller of the first network controller and determines, according to the request message, that the first network controller cannot provide the processing policy. A transmitter is configured to send the processing policy to the first network controller, so that the first network controller sends the processing policy to the forwarding plane device or the lower-level network controller of the first network controller.

Further, that the request message is sent to a second network controller by the first network controller after the first network controller receives the request message sent by a forwarding plane device or a lower-level network controller of the first network controller and determines, according to the request message, that the first network controller cannot provide the processing policy includes: the request message is sent to a primary network controller of the first network controller by the first network controller after the first network controller receives the request message sent by the forwarding plane device or the lower-level network controller of the first network controller and determines, according to the request message, that the first network controller cannot provide the processing policy, and is sent to the second network controller by the first network controller by using the primary network controller of the first network controller if the primary network controller of the first network controller determines, according to the request message, that the primary network controller of the first network controller cannot provide the processing policy; where the second network controller is an upper-level network controller of the primary network controller of the first network controller or a sub network controller of the primary network controller of the first network controller.

The receiver is specifically configured to receive the request message sent by the first network controller by using the primary network controller of the first network controller.

Further, that the request message is sent to a second network controller by the first network controller after the first network controller receives the request message sent by a forwarding plane device or a lower-level network controller of the first network controller and determines, according to the request message, that the first network controller cannot provide the processing policy includes: the request message is sent to a primary network controller of the first network controller by the first network controller after the first network controller receives the request message sent by the forwarding plane device or the lower-level network controller of the first network controller, and is sent to the second network controller by the first network controller after the primary network controller of the first network controller determines, according to the request message, that the primary network controller of the first network controller cannot provide the processing policy, and sends a reject message to the first network controller, where the second network controller is a secondary network controller of the first network controller, and the secondary network controller of the first network controller is at a same level with the primary network controller of the first network controller.

Further, the apparatus further includes: a processor, configured to: before the second network controller sends the processing policy to the first network controller, determine, according to the request message, that the second network controller can provide the processing policy, where the second network controller is the primary network controller of the first network controller.

Further, the processor is further configured to: before the request message sent by the first network controller is received, establish a communication connection with the first network controller.

The receiver is further configured to receive attribute information obtained and sent by the first network controller.

The processor is further configured to: according to the received attribute information obtained by the first network controller, construct a network controller topology and store the network controller topology.

The attribute information obtained by the first network controller includes: attribute information of the first network controller, or attribute information of the first network controller and attribute information of a network controller communicatively connected to the first network controller.

Further, the attribute information of the first network controller includes at least one of an identifier of the first network controller, information used to identify a role of the first network controller, or information used to identify a feature of the first network controller.

The attribute information of the network controller communicatively connected to the first network controller includes at least one of an identifier of a network controller at a same level with the first network controller and communicatively connected to the first network controller, information used to identify a role of the network controller at the same level with the first network controller and communicatively connected to the first network controller, or information used to identify a feature of the network controller communicatively connected to the first network controller.

Further, the receiver is further configured to: after a first topology is constructed and the first topology is stored according to the received attribute information of the first network controller, receive first attribute information of the forwarding plane device sent by the first network controller; and store the first attribute information of the forwarding plane device.

Further, the first attribute information of the forwarding plane device includes at least one of an identifier, a port number, a port Media Access Control MAC address, a port Internet Protocol IP address, a virtual local area network VLAN, bandwidth, a computing capability, or a link feature of the forwarding plane device; and the link feature includes at least one of a device identification number, a port number, a MAC address, or an IP address of a peer device connected to the forwarding plane device.

Further, the receiver is further configured to receive information that is sent by the first network controller and that is used to identify a network function supported by the first network controller; and store the information used to identify the network function supported by the first network controller.

Further, the receiver is further configured to receive second attribute information of the forwarding plane device sent by the first network controller; and store the second attribute information of the forwarding plane device.

Further, the second attribute information of the forwarding plane device includes at least one of flow table information of the forwarding plane device, status information of a link between the forwarding plane devices, or data caching information of the forwarding plane device.

According to the network control apparatus provided in this embodiment, different functions are deployed on different network controllers; and if a first network controller itself cannot provide a processing policy, the first network controller may request the processing policy from another network controller. Therefore, a problem in the prior art is resolved that excessive application programs that can implement network functions are installed on a network controller and an SDN domain controller in a centralized deployment manner, and consequently bring extremely high running overheads to the SDN domain controller and the network controller and easily cause a bottleneck in a control plane. In a network deployment manner, different network functions are separately undertaken by using different network controllers, and if a network controller itself cannot provide a processing policy of processing a network event, the network controller may request the processing policy from another network controller, which reduces computation processing overheads of each network controller, and improves network scalability.

It should be noted that the network control apparatus provided in this embodiment may be configured to execute technical solutions of the method embodiment shown in FIG. 3.

It should be understood that in this embodiment of the present invention, the processor may be a central processing unit (CPU for short), and the processor may also be another general processor, a digital signal processor (DSP), an application-specific integrated circuit (ASIC), a field-programmable gate array (FPGA) or another programmable logical device, a discrete gate or a transistor logic device, a discrete hardware component, or the like. The general processor may be a microprocessor or the processor may also be any conventional processor, or the like.

In an implementation process, the foregoing steps may be completed by using an integrated logic circuit of hardware in the processor or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving, by a first network controller, a request message of a forwarding plane device, wherein the request message comprises information that indicates a network event and information that instructs to request a processing policy of the network event, wherein the first network controller is a primary network controller of the forwarding plane device;
   sending, by the first network controller, the request message to a primary network controller of the first network controller;
   receiving, by the first network controller, a reject message sent by the primary network controller of the first network controller to reject sending the processing policy to the first network controller, based on the primary network controller of the first network controller having determined, according to the request message, that the primary network controller of the first network controller cannot provide the processing policy;
   when the first network controller determines, according to the request message, that the first network controller cannot provide the processing policy, sending, by the first network controller, according to the reject message, the request message to a second network controller, to request the second network controller to provide the processing policy to the first network controller, wherein the second network controller is a secondary network controller of the first network controller, and the secondary network controller of the first network controller is at a same level with the primary network controller of the first network controller; and receiving, by the first network controller, the processing policy sent by the second network controller, and sending the received processing policy to the forwarding plane device.

2. The method according to claim 1, wherein receiving, by the first network controller, the reject message sent by the primary network controller of the first network controller comprises:

when the primary network controller of the first network controller determines, according to the request message, that the primary network controller of the first network controller cannot provide the processing policy, sending, by the first network controller, the request message to a third network controller using the primary network controller of the first network controller, wherein the third network controller is an upper-level network controller of the primary network controller of the first network controller or a sub network controller of the primary network controller of the first network controller.

3. The method according to claim 1, wherein before receiving, by the first network controller, the request message of the forwarding plane device, the method further comprises:

establishing, by the first network controller, a communication connection with the forwarding plane device; and obtaining, by the first network controller, first attribute information of the forwarding plane device, and sending the first attribute information of the forwarding plane device to the second network controller, so that according to the first attribute information of the forwarding plane device, the second network controller constructs a forwarding plane device topology and stores the forwarding plane device topology.

4. The method according to claim 3, wherein the first attribute information of the forwarding plane device comprises at least one of an identifier, a port number, a port Media Access Control (MAC) address, a port Internet Protocol (IP) address, a virtual local area network (VLAN), bandwidth, a computing capability, or a link feature of the forwarding plane device; and wherein the link feature comprises at least one of a device identification number, a port number, a MAC address, or an IP address of a peer device connected to the forwarding plane device.

5. A method, comprising:

receiving, by a second network controller, a request message sent by a first network controller, wherein:
the request message comprises a network event, and requests a processing policy of the network event;
the request message is sent to the second network controller by the first network controller after the first network controller has received the request message from a forwarding plane device or from a lower-level network controller of the first network controller, and after the first network controller has determined, according to the request message, that the first network controller cannot provide the processing policy;
the request message has been sent by the first network controller to a primary network controller of the first network controller after the first network controller has received the request message, and has been sent to the second network controller by the first network controller after the primary network controller of the first network controller has determined, according to the request message, that the primary network controller of the first network controller cannot provide the processing policy, and after the primary network controller has sent a reject message to the first network controller; and
the second network controller is a secondary network controller of the first network controller, and the secondary network controller of the first network controller is at a same level with the primary network controller of the first network controller; and sending, by the second network controller, the processing policy to the first network controller, causing the first network controller to send the processing policy to the forwarding plane device or to the lower-level network controller of the first network controller.

6. An apparatus, comprising:

a receiver, configured to receive a request message of a forwarding plane device, wherein the request message comprises information that indicates a network event and information that instructs to request a processing policy of the network event; and a transmitter, configured to send the request message to a primary network controller of a first network controller;

wherein the receiver is further configured to receive a reject message sent by the primary network controller of the first network controller to reject sending the processing policy to the first network controller, based on the primary network controller of the first network controller having determined, according to the request message, that the primary network controller of the first network controller cannot provide the processing policy;

wherein the transmitter is further configured to send, when the first network controller has determined, according to the request message, that the first network controller cannot provide the processing policy, according to the reject message, the request message to a second network controller, to request the second network controller to provide the processing policy to the first network controller, wherein the first network controller is a primary network controller of the forwarding plane device, wherein the second network controller is a secondary network controller of the first network controller, and wherein the secondary network controller of the first network controller is at a same level with the primary network controller of the first network controller;

wherein the receiver is further configured to receive the processing policy sent by the second network controller; and wherein the transmitter is further configured to send the received processing policy to the forwarding plane device.

7. The apparatus according to claim 6, wherein the receiver is further configured to:

receive the reject message sent by the primary network controller of the first network controller based on the primary network controller of the first network controller having determined, according to the request message, that the primary network controller of the first network controller cannot provide the processing policy, and based on the primary network controller of the first network controller having sent the request message to a third network controller, wherein the third network controller is an upper-level network controller of the primary network controller of the first network controller or a sub network controller of the primary network controller of the first network controller.

8. An apparatus, comprising:
a receiver, configured to receive a request message sent by a first network controller, wherein the request message comprises a network event, and requests a processing policy of the network event, wherein the request message is sent to a second network controller by the first network controller after the first network controller has received the request message from a forwarding plane device or from a lower-level network controller of the first network controller, and after the first network controller has determined, according to the request message, that the first network controller cannot provide the processing policy, wherein the request message has been sent by the first network controller to a primary network controller of the first network controller after the first network controller has received the request message, and has been sent to the second network controller by the first network controller after the primary network controller of the first network controller has determined, according to the request message, that the primary network controller of the first network controller cannot provide the processing policy, and after the primary network controller has sent a reject message to the first network controller, and the second network controller is a secondary network controller of the first network controller, and the secondary network controller of the first network controller is at a same level with the primary network controller of the first network controller; and
a transmitter, configured to send the processing policy to the first network controller, causing the first network controller to send the processing policy to the forwarding plane device or to the lower-level network controller of the first network controller.

9. The apparatus according to claim 8, wherein:
the request message being sent to the second network controller by the first network controller after the first network controller has received the request message from the forwarding plane device or from the lower-level network controller of the first network controller, and after the first network controller has determined, according to the request message, that the first network controller cannot provide the processing policy comprises:
the request message having been sent to a third network controller by the first network controller having used the primary network controller of the first network controller when the primary network controller of the first network controller has determined, according to the request message, that the primary network controller of the first network controller cannot provide the processing policy, wherein the second network controller is an upper-level network controller of the primary network controller of the first network controller or a sub network controller of the primary network controller of the first network controller; and
wherein the receiver is configured to receive the request message sent by the first network controller using the primary network controller of the first network controller.

* * * * *